US006327704B1

(12) United States Patent
Mattson, Jr. et al.

(10) Patent No.: US 6,327,704 B1
(45) Date of Patent: Dec. 4, 2001

(54) SYSTEM, METHOD, AND PRODUCT FOR MULTI-BRANCH BACKPATCHING IN A DYNAMIC TRANSLATOR

(75) Inventors: James S. Mattson, Jr., Campbell; Lacky V. Shah, Sunnyvale; William B. Buzbee, Half Moon Bay; Manuel E. Benitez, Cupertino, all of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/130,421

(22) Filed: Aug. 6, 1998

(51) Int. Cl.[7] ........................................... G06F 9/45
(52) U.S. Cl. ...................... 717/9; 717/5; 717/4; 712/234
(58) Field of Search ..................... 717/4, 5, 6, 9, 717/7; 712/237; 715/4

(56) References Cited

U.S. PATENT DOCUMENTS

| 4,831,517 | * | 5/1989 | Crouse et al. ........................... 717/4 |
| 5,909,578 | * | 6/1999 | Buzbee ..................................... 717/4 |
| 6,148,437 | * | 11/2000 | Shah et al. ............................... 717/4 |
| 6,164,841 | * | 12/2000 | Mattson, Jr. et al. ................... 716/1 |
| 6,189,141 | * | 2/2001 | Benitez .................................... 717/4 |
| 6,205,545 | * | 3/2001 | Shah et al. .......................... 712/237 |
| B1 6,223,339 | * | 4/2001 | Shah et al. ............................. 717/5 |

OTHER PUBLICATIONS

Vcode: A Retargetable,Extensible,Very Fasty Dynamic Code Generation SYSYTEM,Dawson R,Engler © 1996 p., 160–170.*

* cited by examiner

Primary Examiner—Tuan Q. Dam
Assistant Examiner—Chuck O. Kendall

(57) ABSTRACT

A computer-implemented system, method, and product are provided for multi-branch backpatching in a dynamic translator. Such backpatching typically increases the speed of execution of translated instructions by providing a direct control path from translated multi-branch-jump instructions to their translated target instructions. In one embodiment, the multi-branch backpatching dynamic translator undertakes backpatching on an "as-needed" basis at run time. That is, backpatching is done for those branch targets that are executed rather than for all branch targets, or rather than for those branch targets that are estimated or assumed will be executed. Such backpatching is accomplished in one embodiment by generating dynamic backpatching code specific to each translated multi-branch-jump instruction. A multi-branch jump, or switch, table of each multi-branch-jump instruction is initialized so that all entries direct control to the dynamic backpatching code for that instruction. As branches of the multi-branch-jump instruction are executed, the dynamic backpatching code enables a backpatcher that replaces the corresponding entry in the translated multi-branch-jump table with pointers to the address of the translated target address, if present.

38 Claims, 10 Drawing Sheets

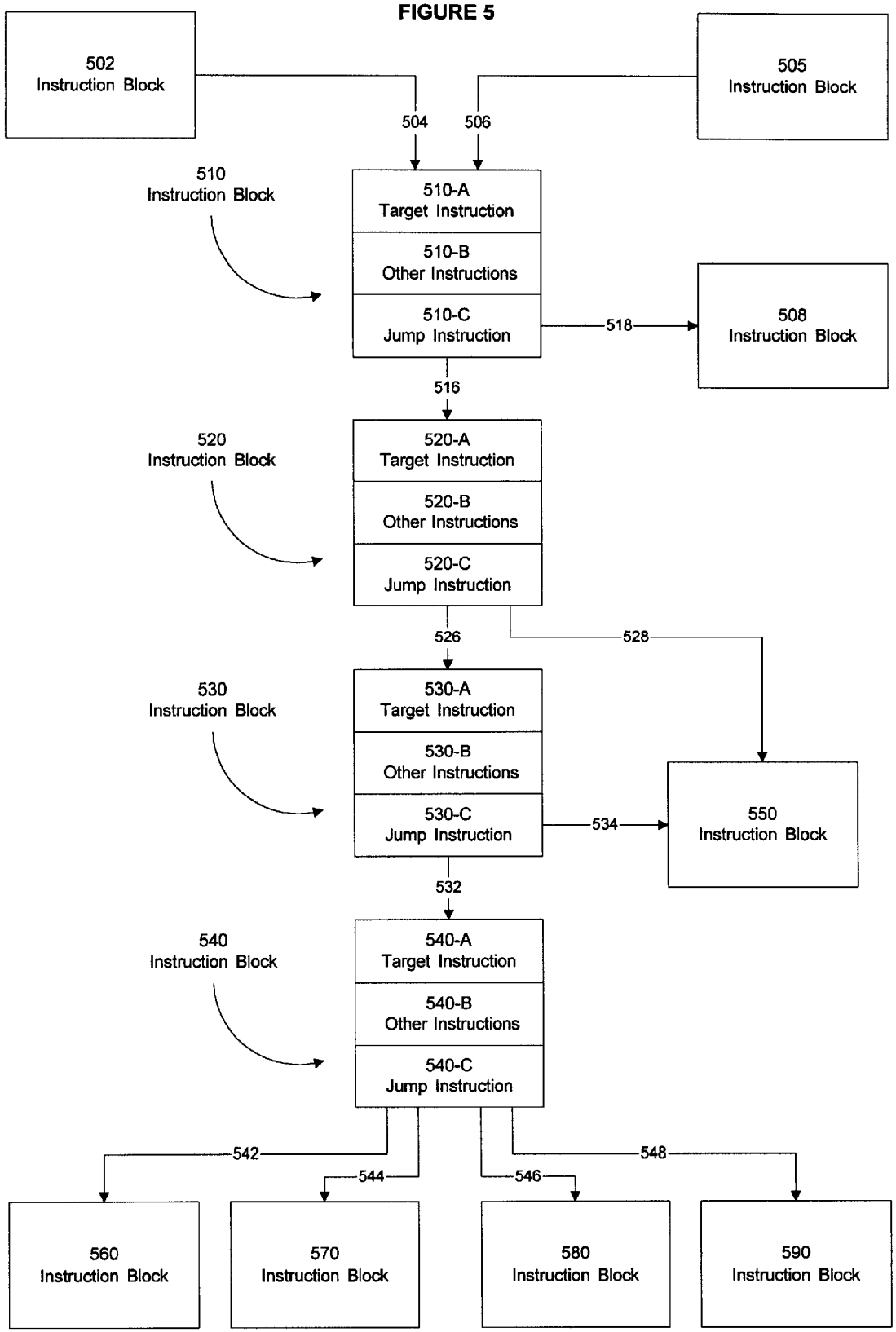

| 212 Trace History Table ||
|---|---|
| Arc Identifier | Arc Counter |
| 504 | 25 |
| 506 | 25 |
| 516 | 50 |
| 518 | 3 |
| 526 | 48 |
| 528 | 2 |
| 532 | 45 |
| 534 | 3 |
| 542 | 5 |
| 544 | 5 |
| 546 | 5 |
| 548 | 30 |

FIGURE 8A

| 717 Optimized Intermediate Representation | |
|---|---|
| 8A-1 | ADD r1, r2, r3 |
| 8A-2 | CMP r3, r4 |
| 8A-3 | JMP IF > LABEL3 |
| 8A-4 | JMP IF <= [r5] |
| 8A-5 | LABEL4: CMP r7, 0 |
| 8A-6 | JMP IF < ERROR |
| 8A-7 | CMP r7, 4 |
| 8A-8 | JMP IF >= ERROR |
| 8A-9 | JMP [ r7 * 4 + TABLE ] |
| 8A-10 | TABLE: [address0] |
| 8A-11 | [address1] |
| 8A-12 | [address2] |
| 8A-13 | [address3] |

FIGURE 8C

| 204 Dynamic Backpatch Routine Area | |
|---|---|
| 8C-1 | PATCH1: PUSH TABLE |
| 8C-2 | PUSH BPTABLE |
| 8C-3 | PUSH r7 |
| 8C-4 | JMP MBB |

FIGURE 8B

| 202 Tr. Inst. Storage Area | |
|---|---|
| 8B-1 | ADD r1, r2, r3 |
| 8B-2 | CMP r3, r4 |
| 8B-3 | JMP IF <=TL1 |
| 8B-4 | PUSH LABEL3 |
| 8B-5 | CALL DIRBP |
| 8B-6 | TL1: JMP IF > TL2 |
| 8B-7 | PUSH r5 |
| 8B-8 | JMP DRIVER |
| 8B-9 | TL2: CMP r7, 0 |
| 8B-10 | JMP IF >= TL3 |
| 8B-11 | PUSH ERROR |
| 8B-12 | CALL DIRBP |
| 8B-13 | TL3: CMP r7, 4 |
| 8B-14 | JMP IF < TL4 |
| 8B-15 | PUSH ERROR |
| 8B-16 | CALL DIRBP |
| 8B-17 | TL4: JMP [ r7*4 + BPTABLE ] |
| 8B-18 | BPTABLE: PATCH1 |
| 8B-19 | PATCH1 |
| 8B-20 | PATCH1 |
| 8B-21 | PATCH1 |

FIGURE 8D

| 202 Tr. Inst. Storage Area | |
|---|---|
| 8D-1 | ADD r1, r2, r3 |
| 8D-2 | CMP r3, r4 |
| 8D-3 | JMP IF <=TL1 |
| 8D-4 | NOP |
| 8D-5 | JMP TR_LABEL3 |
| 8D-6 | TL1: JMP IF > TL2 |
| 8D-7 | PUSH r5 |
| 8D-8 | JMP DRIVER |
| 8D-9 | TL2: CMP r7, 0 |
| 8D-10 | JMP IF >= TL3 |
| 8D-11 | PUSH ERROR |
| 8D-12 | CALL DIRBP |
| 8D-13 | TL3: CMP r7, 4 |
| 8D-14 | JMP IF < TL4 |
| 8D-15 | PUSH ERROR |
| 8D-16 | CALL DIRBP |
| 8D-17 | TL4: JMP [ r7*4 + BPTABLE ] |
| 8D-18 | BPTABLE: PATCH1 |
| 8D-19 | PATCH1 |
| 8D-20 | TR_ADD2 |
| 8D-21 | PATCH1 |

SYSTEM, METHOD, AND PRODUCT FOR MULTI-BRANCH BACKPATCHING IN A DYNAMIC TRANSLATOR

BACKGROUND OF THE INVENTION

1. Field of the Invention

The invention generally relates to computer systems or computer-implemented systems employing translating or optimizing compilers and methods, and, more particularly, to dynamic translating compilers and methods.

2. Related Art

A variety of techniques are known for static translation of the executable instructions of a computer software program. Such known techniques are implemented by static compilers, i.e., compilers that translate a program prior to execution. One disadvantage of such techniques is that the dynamic behavior of a program typically is more readily and accurately ascertained while it is being executed than while it is being compiled prior to execution.

Some systems and methods exist that avoid this disadvantage by a process generally referred to as dynamic translation. That is, a dynamic compiler operates upon an executable image of the original software program as it is being executed at run time. Typically, the dynamic compiler is thus better able to deduce those paths that execution is most likely to take through particular portions of the program (often referred to as the control flow through the instructions of the program).

Such known dynamic translation systems may be designed to accomplish one or more of a number of tasks. One task is referred to as cross-platform translation, in which a program designed and written for execution on a computer system having a particular architecture and operating system is translated so that the translated program may be executed on another type of computer system. Some existing dynamic translation systems include "Daisy" by International Business Machine Corporation, "fx!32" from Digital Equipment Corporation, and "Wabi" from Sun Microsystems.

Dynamic translation systems are also used for instrumentation and profiling of programs without the need for recompilation. The term "instrumentation" refers generally to the insertion of special code to detect or record various parameters of execution, and "profiling" refers generally to reporting such parameters. Such use may also be referred to as "monitoring." Examples of existing products intended for such uses include "Shade" from Sun Microsystems and "ATOM" from Digital Equipment Corporation.

Such tasks of dynamic translation systems generally are also undertaken by static translation systems, albeit with the noted disadvantage. However, another task traditionally carried out by static translation systems is not adequately carried out by known dynamic translation systems. Such task is optimization; that is, the alteration, deletion, rearrangement, or other revision of instructions, or the addition of new instructions, with the specific objectives of increasing the speed of execution of executable instructions, decreasing the amount of computer resources needed for such execution, or both. Therefore, what is needed is a system, method, and product for increasing the opportunities for, and efficiencies of, dynamic optimization of executable instructions. More generally, what is needed is a system, method, and product for increasing the efficiencies of dynamic translation systems irrespective of their purpose.

SUMMARY OF THE INVENTION

The present invention is a system, method, and product for improving the speed of dynamic translation systems by backpatching multi-branch-jump instructions that have been translated. (As the term is used herein, an "instruction" may specify an operation, such as jump, add, or compare; may specify an address; or may perform another of a variety of known functions.) In one embodiment of the invention, a multi-branch backpatching dynamic translator is disclosed. In one aspect of such embodiment, the multi-branch backpatching dynamic translator undertakes backpatching on an "as-needed" basis at run time. That is, backpatching is done for those branch targets that are executed rather than for all branch targets, or rather than for those branch targets that are estimated or assumed will be executed.

The term "backpatch," and its grammatical variants, will be understood by those skilled in the relevant art to refer to the replacement, typically by overwriting, of one or more executable instructions by new executable instructions. Typically, the function of backpatching is to redirect a jump instruction so that it transfers control to a new target instruction. With respect to the present invention, such new target instruction typically is the first-executed in a group of instructions that are a translated version of the instructions to which the backpatched jump instruction passed control. Optionally, such translated instructions may also be dynamically instrumented, optimized, profiled, otherwise processed, or any combination thereof. The terms "dynamically instrumented," "dynamically optimized," and their grammatical variants, refer respectively herein to the application of any of a variety of instrumentation and optimization techniques, now known or to be developed in the future, to instructions or groups of instructions at run time.

As the term is used herein, a "multi-branch-jump instruction" is one in which control is transferred from such instruction to one of two or more instructions, referred to herein as "target instructions." Also, as the term is used herein, a multi-branch-jump instruction typically is an indirect jump instruction; that is, it passes control to an address containing another address to which control is in turn passed.

To effectuate such indirect jumps, a multi-branch-jump instruction typically utilizes a table with entries representing the addresses, or offsets from a base address, at which the target instructions of the indirect jumps are stored. Such a table is referred to herein as a "multi-branch-jump table" (also commonly referred to as a "switch table"). It will be understood by those skilled in the relevant art that a multi-branch-jump table may, for example, be constructed by a static compiler so that it includes possible target-instruction addresses. At run time, an index into the table typically is generated to specify to which of the possible target instructions control passes. As used herein, the term "multi-branch-jump table" is used broadly to refer to any known, or later-to-be developed, technique for specifying an address to which control passes. For example, the addresses specified in the instructions of a multi-branch-jump table may be kept in registers, or in memory locations that need not be contiguous. Also, the instructions of a multi-branch-jump table need not be included in a contiguous block of instructions such as is illustratively illustrated herein.

The term "hot trace" is used herein to refer to a trace through which control frequently passes, or, in some embodiments, has passed more than a predetermined number of times. For convenience, the term "frequent," and its grammatical variants, are used herein to refer both to control passing through instructions either at a rate, or for a number of times, greater than a threshold value. A trace typically is made up of one or more "instruction blocks," which are groups of original instructions of an executable file. An instruction block is made up of one or more "basic blocks," each of which is a sequence of original instructions of an executable file. Each of the original instructions of a basic block may be reached through a common control path. That is, there is only one entrance into, and one exit out of, a basic block. The entrance is the first instruction in the sequence, and the exit is the last instruction in the sequence. A basic block may consist of a single instruction.

As the term is illustratively used herein, an instruction block also has one exit instruction through which control passes out of the block, which is the last instruction in the block. However, control may enter an instruction block through more than one instruction of the block. That is, because an instruction block may include more than one basic block, and control may pass to the first instruction of a basic block from an instruction that is not included in the same instruction block, there are potentially more than one control paths into an instruction block.

A control path from one instruction block to another instruction block is referred to herein as an "arc." The action of transferring control over an arc, other than by an unconditional fall-through, is referred to as a "jump." An unconditional fall-through is the unconditional passing of control from a first instruction to the instruction immediately following such first instruction. An instruction that causes a jump to occur is referred to herein as a "jump instruction." As illustratively provided herein, the last instruction in a basic block or an instruction block is a jump instruction, and such jump instruction is the only jump instruction in the basic block or instruction block. An "indirect jump" is a jump to a register or memory location that contains the address of the target instruction of the jump. A "direct jump" is a jump to the address of the target instruction of the jump. The instruction to which a jump is directed is a target instruction.

In one embodiment, the present invention is a computer-implemented method for multi-branch backpatching in a dynamic translator. The method is used with an appropriate computing system having at least one memory storage unit in which the original instructions of an executable file are stored. These original instructions may include multi-branch-jump instructions and corresponding multi-branch-jump-table instructions. As noted, each of the multi-branch-jump-table instructions identifies an address of an original target instruction in the executable file to which control transfers when control passes to the multi-branch-jump-table instruction from the multi-branch-jump instruction. The method includes: (1) translating a multi-branch jump instructions; (2) translating a corresponding multi-branch-jump-table instruction; (3) determining if the target instruction of the multi-branch jump instruction has been translated; and, (4) if there is such a translated target instruction, backpatching the translated multi-branch-jump-table instruction so that it passes control to the translated target instruction. In one implementation of the method, step (4) is done at the time that control passes to the translated multi-branch-jump-table instruction.

The method may also include (5) identifying the multi-branch-jump instruction; and (6) identifying the multi-branch-jump-table instructions. In another implementation, the method includes (5) tentatively identifying an instruction that has a plurality of control paths leading from it as a multi-branch-jump instruction; (6) identifying multi-branch-jump-table instructions; and (7) verifying that the tentatively identified multi-branch-jump instruction is indeed such an instruction by determining that each control path from the tentatively identified multi-branch-jump instruction leads to any one of the multi-branch-jump-table instructions.

In a further embodiment, the invention is a computer system having at least one memory storage unit. Original instructions of an executable file are stored in the memory storage unit. The original instructions may include a multi-branch-jump instruction and multi-branch-jump-table instructions. The multi-branch-jump-table instructions each identify an address of an original target instruction to which control transfers when control passes to each multi-branch-jump-table instruction from the multi-branch-jump instruction. The computer system also has a multi-branch backpatching dynamic translator including: (1) a multi-branch instruction translator constructed and arranged to (a) translate the multi-branch jump instruction; (b) translate a corresponding multi-branch-jump-table instruction; (c) determine if the target instruction of the multi-branch jump instruction has been translated; and, (d) if there is such a translated target instruction, backpatch the translated multi-branch-jump-table instruction so that it passes control to the translated target instruction. In one implementation of the method, the backpatching step is done at the time that control passes to the translated multi-branch-jump-table instruction.

In one implementation, the computer system also includes an instruction analyzer constructed and arranged to identify the multi-branch-jump instruction and the multi-branch-jump-table instruction. The instruction analyzer may verify that a tentatively identified multi-branch-jump instruction is indeed such an instruction by determining that each control path from it leads to any one of the multi-branch-jump-table instructions.

The computer system may include an original instruction processor that is constructed and arranged to determine if the target instruction of the multi-branch jump instruction has been translated; and, if there is such a translated target instruction, backpatch the translated multi-branch-jump-table instruction so that it passes control to the translated target instruction. In one implementation, such backpatching is done at the time that control passes to the translated multi-branch-jump-table instruction. The original instruction processor may also be constructed and arranged to retrieve original instructions from the memory unit and determine if they are frequently executed instructions. Also, if an original instruction is not frequently executed, the original instruction processor may emulate it and record the passage of control through it. In one implementation, the original instruction processor determines that the original instruction is frequently executed when it is executed more than a predetermined number of times in a predetermined interval. In another implementation, the original instruction processor determines that the first original instruction is frequently executed when it is executed more than a predetermined number of times in a predetermined interval, and is a jump instruction.

The computer system may also include an original instruction translator constructed and arranged to (a) receive an original instruction from the original instruction processor when the original instruction has been determined to be frequently executed, (b) identify a hot trace starting with a start-of-trace instruction and ending with an end-of-trace instruction having a trace control path in common with the start-of-trace instruction, and (c) translate the hot trace. Also, the original instruction translator may dynamically optimize the translated hot trace.

In one embodiment, the executable file stored in the memory unit of the computer system may include a direct jump code instruction and a corresponding direct jump target instruction containing a first direct jump target address. In such embodiment, the multi-branch backpatching dynamic translator also includes a direct jump code generator constructed and arranged to (a) determine if the direct jump target instruction has been translated, (b) determine a translated first direct jump target instruction address that is an address of the translated first direct jump target instruction, and (c) if the translated first direct jump target instruction exists, translate the first direct jump code instruction to provide a translated first direct jump code instruction. Also included in such embodiment is a direct jump backpatcher constructed and arranged to (a) receive control from the translated first direct jump code instruction, (b) obtain from the direct jump code generator the translated first direct jump target address, and (c) if the translated first direct jump code instruction is executed, backpatch the translated first direct jump code instruction so that it passes control to the translated first direct jump target address.

In yet a further embodiment, the multi-branch instruction translator is constructed and arranged to (a) determine the number of potential control paths leading out of a multi-branch-jump instruction, (b) generate an equal number of backpatch-table instructions, each of which corresponds to one potential control path, (c) store the same dynamic backpatching code address in each such backpatch-table instruction, (d) if the translated first target instruction exists, generate at least one dynamic backpatching instruction that preserves an original target instruction address that is the address of an original target instruction and generate a backpatch-table instruction address that is the address of a backpatch-table instruction that corresponds with the first original target instruction address, and (e) translate the multi-branch jump instruction, wherein such translation includes replacing an original target instruction address with a corresponding backpatch-table instruction address. In one implementation, the multi-branch backpatcher further is constructed and arranged to (f) if the first multi-branch jump instruction is executed, determine the one backpatch-table instruction to which control passes, and (g) replace, in the one backpatch-table instruction, the same dynamic backpatching code address with a translated original target instruction address. In one aspect of such implementation, the dynamic backpatching instruction, when executed, transfers control to the multi-branch backpatcher.

In one embodiment, the invention is storage media containing software. The software may be executed on an appropriate computing system having at least one central processing unit (CPU) and at least one memory unit. Original instructions of an executable file may be stored in the memory unit. Such instructions may include a multi-branch-jump instruction and corresponding multi-branch-jump-table instructions each identifying an address of an original target instruction to which control transfers when control passes to each multi-branch-jump-table instruction from the multi-branch-jump instruction. The software performs a method for multi-branch backpatching in a dynamic translator including: (1) translating a multi-branch jump instruction; (2) translating a corresponding multi-branch-jump-table instruction; (3) determining if the target instruction of the multi-branch jump instruction has been translated; and, (4) if there is such a translated target instruction, backpatching the translated multi-branch-jump-table instruction so that it passes control to the translated target instruction. In one implementation of the method, step (4) is done at the time that control passes to the translated multi-branch-jump-table instruction. The method may also include (5) identifying the multi-branch-jump instruction; and (6) identifying the multi-branch-jump-table instructions.

BRIEF DESCRIPTION OF THE DRAWINGS

The above and further advantages of the invention will be more clearly appreciated from the following detailed description when taken in conjunction with the accompanying drawings, in which like reference numerals indicate like structures or method steps, in which the leftmost one or two digits of a reference numeral indicate the number of the figure in which the referenced element first appears (for example, the element 240 appears first in FIG. 2, the element 1010 appears first in FIG. 10), solid lines generally indicate control flow, dotted lines generally indicate data flow, and wherein:

FIG. 5 is a symbolic representation of an illustrative group of instruction blocks connected by control paths originating from the target of a frequently executed instruction identified by one embodiment of a frequent instruction identifier of the original instruction processor of FIG. 3;

FIG. 8A is a representation of an illustrative example of an intermediate representation of original instructions as translated and optimized by the translated code generator of FIG. 7;

FIG. 8B is a representation of a further translation of the instructions of FIG. 8A;

FIG. 8C is a representation of an illustrative example of dynamic backpatching code suitable for use with the instructions of FIG. 8B;

FIG. 8D is a representation of the instructions of FIG. 8B after a portion of the target addresses in FIG. 8B have been backpatched by the backpatcher of FIG. 10;

DETAILED DESCRIPTION

Figure 1:
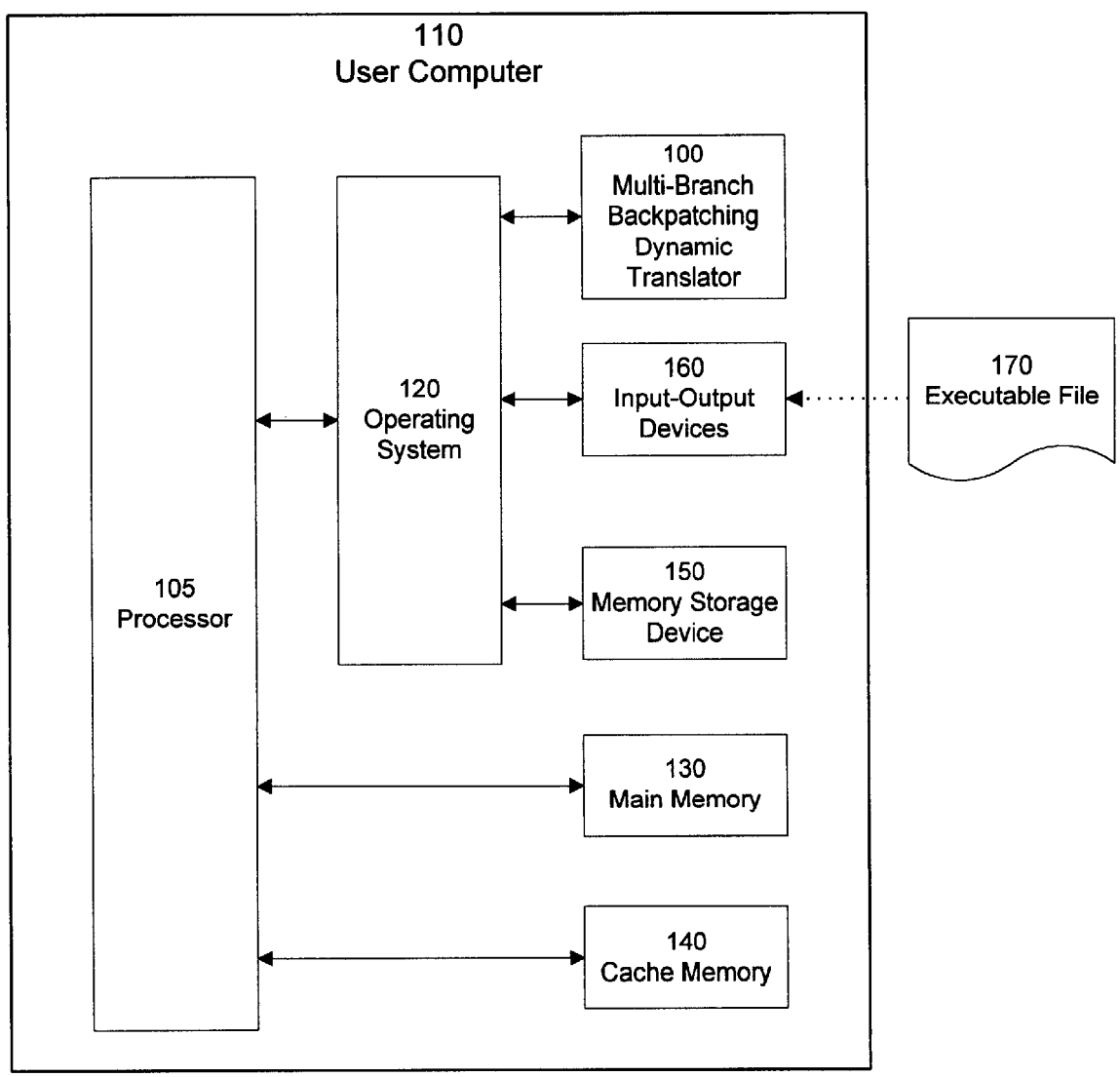
FIG. 1 is a functional block diagram of one embodiment of a computer system on which one embodiment of the multi-branch backpatching dynamic translator of the present invention is implemented.

The attributes of the present invention and its underlying method and architecture will now be described in greater detail with reference to one embodiment of the invention, referred to as multi-branch backpatching dynamic translator 100, or simply translator 100, aspects of which are illustrated in FIGS. 1 through 10. References are made to various terms that are described in the Summary above.

In this detailed description, various functional elements of the present invention are described that may be implemented either in software, hardware, firmware, or any combination thereof. For convenience of illustration, descriptions generally are made with respect to implementations in software. Such descriptions therefore typically refer to software-implemented functional elements that will be understood to comprise sets of software instructions that cause described functions to be performed. Similarly, in a software implementation, translator 100 as a whole may be referred to as "a set of multi-branch backpatching dynamic translation instructions."

It will be understood by those skilled in the relevant art that the functions ascribed to translator 100, or any of its functional elements, typically are performed by the central processing unit (CPU) of the computer system executing such software instructions, typically in cooperation with the operating system of the computer system. More generally, it will be understood that functions performed by the invention, whether implemented in software, hardware, firmware, or any combination thereof, typically are performed by the CPU in cooperation with the operating system, or by a special purpose processor. Henceforth, the fact of such cooperation among the CPU and operating system (or a special purpose processor), and the elements of the invention, whether implemented in software, hardware, firmware, or any combination thereof, may therefore not be repeated or further described, but will be understood to be implied. In particular, the cooperative functions of the operating system, which are well known to those skilled in the relevant art, may be omitted for clarity.

It will also be understood by those skilled in the relevant art that the functions ascribed to translator 100 and its functional elements, whether implemented in software, hardware, firmware, or any combination thereof, may in some embodiments be included in the functions of the operating system. That is, for example, operating system 120 may include translator 100. In such embodiments, the functions of translator 100 may be described with reference to the execution by the CPU of a set of multi-branch backpatching dynamic translation instructions, but without reference to cooperation with a separate operating system. In such embodiments, the functions ascribed to translator 100, or any of its functional elements, typically are performed by the CPU executing such software instructions in cooperation with aspects of operating system 120 other than translator 100. Therefore, in such embodiments, cooperation by translator 100 with aspects of an operating system will not be stated, but will be understood to be implied.

The computer system that implements the present invention is referred to herein as the "user computer." It will be understood, however, that such term is intended to include any type of computing platform, whether or not operated by a user.

USER COMPUTER 110

FIG. 1 is a simplified functional block diagram of one exemplary embodiment of a computer system, referred to as user computer 110, on which translator 100 is implemented. User computer 110 may be a personal computer, network server, workstation, or other computer platform now or later developed. User computer 110 may also be a device specially designed and configured to support and execute the functions of translator 100 as described below. User computer 10 includes known components including processor 105, operating system 120, main memory 130, cache memory 140, memory storage device 150, and input-output devices 160. It will be understood by those skilled in the relevant art that there are many possible configurations of the components of user computer 110 and that some components that may typically be included in user computer 110 are not shown, such as a video card, data backup unit, and many other devices.

Processor 105 may be a commercially available processor such as a PA-RISC processor made by Hewlett-Packard Company, a SPARC® processor made by Sun Microsystems, a 68000 series microprocessor made by Motorola, an Alpha processor made by Digital Equipment Corporation, or it may be one of other processors that are or will become available. In one preferred aspect of the present embodiment, processor 105 is a PA-8000 RISC processor made by Hewlett-Packard Company.

Processor 105 executes operating system 120, which may be, for example, one of the DOS, Windows 3.1, Windows for Work Groups, Windows 95, Windows 98, or Windows NT operating systems from the Microsoft Corporation, the System 7 or System 8 operating system from Apple Computer, the Solaris operating system from Sun Microsystems, a Unix®-type operating system available from many vendors such as Sun Microsystems, Inc., Hewlett-Packard, or AT&T, the freeware version of Unix® known as Linux, the NetWare operating system available from Novell, Inc., or some combination thereof, or another or a future operating system. In one aspect of the illustrated embodiment, operating system 120 is the HPUX version of the Unix® operating system made by Hewlett-Packard Company. Operating system 120 interfaces with firmware and hardware in a well-known manner, and facilitates processor 105 in coordinating and executing the functions of the other components of user computer 110.

Main memory 130 may be any of a variety of known memory storage devices or future memory devices, including, for example, any commonly available random access memory (RAM), magnetic medium such as a resident hard disk, or other memory storage device. In one aspect of the illustrated embodiment, main memory 130 is made up of dynamic random access memory (DRAM) chips.

Cache memory 140 may similarly be any of a variety of known memory storage devices or future devices, including the examples noted above with respect to main memory 130. In one aspect of the illustrated embodiment, cache memory 150 typically is made up of static random access memory (SRAM) chips. In an alternative embodiment, cache memory 140 may be located on the same chip as processor 105.

Memory storage device 150 may be any of a variety of known or future devices, including a compact disk drive, a tape drive, a removable hard disk drive, or a diskette drive. Such types of memory storage device 150 typically read from, and/or write to, a program storage device (not shown) such as, respectively, a compact disk, magnetic tape, removable hard disk, or floppy diskette. Any such program storage device may be a computer program product. As will be appreciated, such program storage devices typically include a computer usable storage medium having stored therein a computer software program and/or data.

Computer software programs, also called computer control logic, typically are stored in main memory 130, cache memory 140, and/or the program storage device used in conjunction with memory storage device 150. Such computer software programs, when executed by processor 105, enable user computer 110 to perform the functions of the present invention as described herein. Accordingly, such computer software programs may be referred to as controllers of user computer 110.

In one embodiment, the present invention is directed to a computer program product comprising a computer usable medium having control logic (computer software program, including program code) stored therein. The control logic, when executed by processor 105, causes processor 105 to perform the functions of the invention as described herein. In another embodiment, the present invention is implemented primarily in hardware using, for example, a hardware state machine. Implementation of the hardware state machine so as to perform the functions described herein will be apparent to those skilled in the relevant arts.

Input devices of input-output devices 160 could include any of a variety of known devices for accepting information from a user, whether a human or a machine, whether local or remote. Such devices include, for example a keyboard, mouse, touch-screen display, touch pad, microphone with a voice recognition device, network card, or modem. Output devices of input-output devices 160 could include any of a variety of known devices for presenting information to a user, whether a human or a machine, whether local or remote. Such devices include, for example, a video monitor, printer, audio speaker with a voice synthesis device, network card, or modem. Input-output devices 160 could also include any of a variety of known removable storage devices, including a CD-ROM drive, a tape drive, a removable hard disk drive, or a diskette drive.

Translator 100 could be implemented in the "C" or "C++" programming languages, although it will be understood by those skilled in the relevant art that many other programming languages could be used. Also, as noted, translator 100 may be implemented in any combination of software, hardware, or firmware. If implemented in software, translator 100 may be loaded into memory storage device 150 through one of input-output devices 160. Translator 100 may also reside in a read-only memory or similar device of memory storage device 150, such devices not requiring that translator 100 first be loaded through input-output devices 160. It will be understood by those skilled in the relevant art that translator 100, or portions of it, may typically be loaded by processor 105 in a known manner into main memory 130 or cache memory 140 as advantageous for execution.

Figure 2:
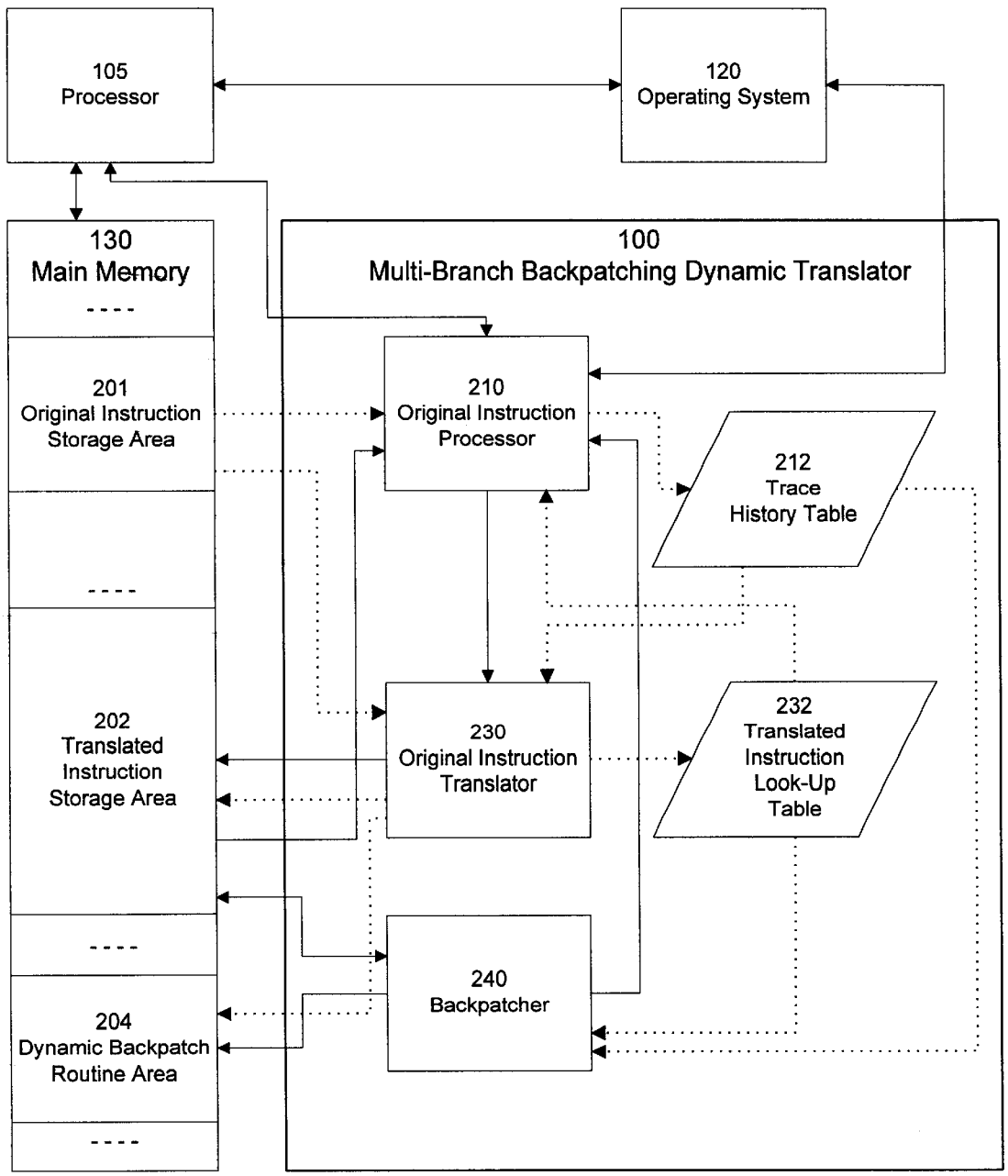
FIG. 2 is a functional block diagram of the multi-branch backpatching dynamic translator of FIG. 1, including its input and output connections to other elements of the computer system of FIG. 1.
Figure 3:
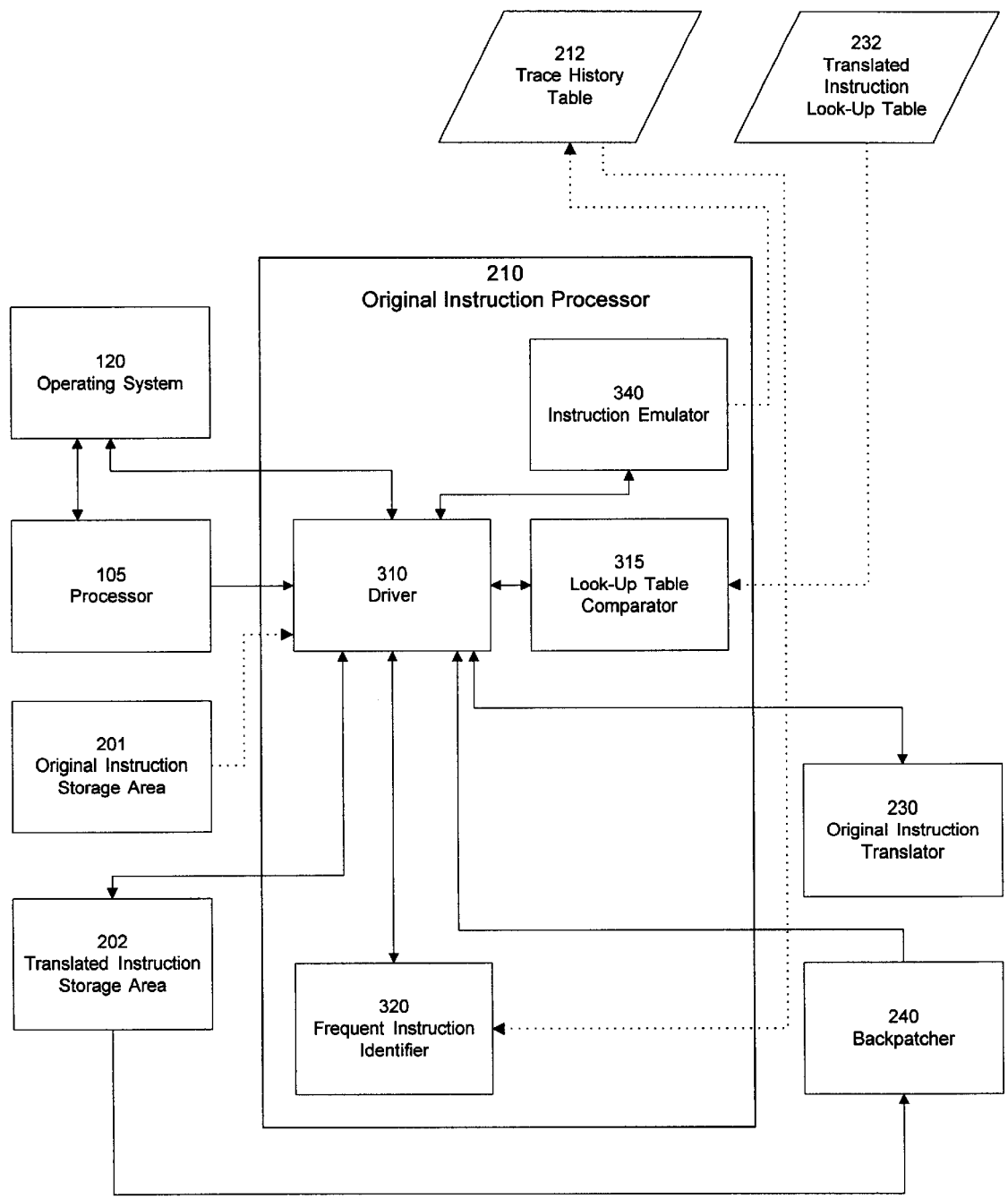
FIG. 3 is a functional block diagram of one embodiment of an original instruction processor of the multi-branch backpatching dynamic translator of FIG. 2, including its input and output connections to other elements of the multi-branch backpatching dynamic translator and of the computer system of FIG. 1.

Executable file 170 may be any of a variety of known executable files or an executable file of a type to be developed in the future. Examples of such known files are those having an extension of ".exe" operating under a DOS or Windows operating system or an "a.out" file of a Unix®-type operating system. Executable file 170 may typically be loaded through an input device of input-output devices 160, such as a diskette drive, and a copy of it placed by processor 105 into memory storage device 150 or main memory 130. A copy of executable file 170, or portions of it, (hereafter, simply referred to as executable file 170) may alternatively be placed by processor 105 into cache memory 140 for speedier execution. In the illustrated embodiment, it will be assumed for clarity that operating system 120 causes processor 105 to place the instructions and data of executable file 170, constituting what is referred to herein as the "original instructions," in main memory 130 for execution. The portion of main memory 130 in which such original instructions are stored is schematically represented in FIG. 2 as original instruction storage area 201.

MULTI-BRANCH BACKPATCHING DYNAMIC TRANSLATOR 100

Multi-branch backpatching dynamic translator 100 identifies multi-branch-jump instructions and their related multi-branch-jump tables and range-verification instructions, translates such instructions, and backpatches the translated multi-branch-jump tables so that they direct jumps from translated multi-branch-jump instructions directly to translated target instructions, if present.

Advantageously, such backpatching eliminates the need to pass control from a translated multi-branch-jump instruction to a driver and then to the translated target instruction. A driver typically determines whether the target has been translated, finds the address of a translated target, and then passes control to such address. Also advantageously, such backpatching in the illustrated embodiment occurs selectively, i.e., on an as-needed basis, although it need not be so in other embodiments. That is, backpatching is undertaken in the illustrated embodiment if control passes through a translated multi-branch-jump instruction to a previously translated target instruction. In such manner, the time required for backpatching is expended only if a need to backpatch is confirmed by the control flow at run time.

FIG. 2 is a functional block diagram of translator 100. As shown in FIG. 2, translator 100 includes original instruction processor 210 that takes control from processor 105 in order to identify appropriate groups of original instructions for translation. In particular, original instruction processor 210 fetches the original instruction that is to be processed; determines whether it has previously been translated; if it has not previously been translated, determines whether it has been executed frequently; and, if it has not been executed frequently, emulates it and records the passage of control through it if it is a jump instruction. Translator 100 also includes original instruction translator 230 that translates, and, in the illustrated embodiment, optimizes, hot traces. In particular, original instruction translator 230 identifies a hot trace containing a frequently executed original instruction, generates translated and optimized code for the hot trace, generates code to cause control to pass from the translated and optimized code to backpatcher 240, and stores the translated and optimized code in translated instruction storage area 202.

Also included in translator 100 is backpatcher 240. Backpatcher 240 backpatches entries in the multi-branch-jump table of a translated multi-branch-jump instruction so that control passes directly from such entries to translations, if present, of the instructions pointed to by such entries. Backpatcher 240 also backpatches direct-jump target addresses by substituting therefor corresponding translated target addresses, if present. Advantageously, such backpatching is accomplished in the illustrated embodiment on an as-needed basis.

ORIGINAL INSTRUCTION PROCESSOR 210

As noted, original instruction processor 210 identifies appropriate groups of original instructions for translation. The functions of original instruction processor 210, and the input and output connections of such functions, are shown in greater detail in FIG. 3. Original instruction processor 210 includes driver 310 that interrupts normal execution by processor 105 to assume control over execution, initiates the processing of instructions in original instruction storage area 201, assigns a unique identifier to original instructions as they are processed, directs the operations of other elements of original instruction processor 210, and directs control to translated instructions as their corresponding original instructions are encountered so that the translated instructions may be executed. Also, control typically passes to driver 310 from any element of translator 100 if the address of the next instruction to be executed is not available to such element.

Original instruction processor 210 also includes look-up table comparator 315 that determines whether there exists a translated instruction corresponding to an original instruction being processed by original instruction processor 210. Original instruction processor 210 further includes frequent instruction identifier 320 that determines whether an original instruction being processed by original instruction processor 210 has been executed frequently so that it is translated rather than emulated. Also included in original instruction processor 210 is instruction emulator 340. Instruction emulator 340 emulates an original instruction being processed by original instruction processor 210 so that it may determine whether an original instruction being processed is a jump instruction, and, if so, record the occurrence of its execution.

Driver 310 and Look-Up Table Comparator 315

In a known manner, operating system 120 passes control to driver 310 prior to executing the first original instruction of executable file 170. Driver 310 cooperates with operating system 120 in a known manner to cause processor 105 to save its current machine state and to pass control over execution of the original instructions from processor 105 to driver 310. As is well known to those skilled in the art, the current machine state typically includes the values of registers, status flags, system memory locations, the program counter, and other values (not shown) that enable processor 105 to resume conventional processing without error when such values are restored. Driver 310 makes a copy (not shown) of the machine state saved by processor 105 that, in one embodiment, may be stored in main memory 130. During emulation and translation, the dynamic translator updates the saved machine state to reflect the changes effected by the execution of the program. When the operations of translator 100 are ended or terminated, driver 310 restores the updated machine state values so that processor 105 may resume conventional processing.

Driver 310 fetches the first original instruction from original instruction storage area 201 and increments the saved value of the program counter to point to the second instruction. Driver 310 assigns a unique identifier to such instruction, and to each other original instruction it fetches. In the illustrated embodiment, the addresses of the first, and subsequent, original instructions advantageously serve as such instructions' respective unique identifiers. Such addresses typically are expressed as offsets relative to a base address, although absolute addresses or other schemes may be used in other embodiments. It will be understood by those skilled in the relevant art that other schemes for assigning unique identifiers to original instructions may be employed in other embodiments.

For purposes of illustration, it will be assumed that driver 310 fetches an original instruction, referred to hereafter as the current original instruction, from original instruction storage area 201. Driver 310 then passes control to look-up table comparator 315. Using any of a variety of known techniques, such as search and compare techniques, comparator 315 compares the unique identifier of the current original instruction to a list of unique identifiers in translated instruction look-up table 232. As is described below, table 232 includes unique identifiers that identify original instructions that have been translated and placed in translated instruction storage area 202.

Such translated instructions typically are dynamically optimized in the illustrated embodiment if known dynamic optimization techniques are applicable. Thus, such instructions may be referred to hereafter for convenience as translated and optimized instructions. However, it is not material to the present invention whether such optimization takes place. Use of the term "translated and optimized," and similar terms, will therefore be understood generally to include embodiments in which instructions are translated, but not necessarily optimized.

For purposes of illustration, it is assumed that the current original instruction previously has been translated and optimized by translator 100 and that an entry of the unique identifier for the current original instruction therefore has been made in table 232. Upon determining such fact, comparator 315 returns control to driver 310 with an indication that a match has been found between the unique identifier of the current original instruction and an entry in the original instruction identifier field of a record of table 232. Comparator 315 also provides to driver 310 the contents of the entry in the translated instruction address field of the same record. Such contents represent the address in translated instruction storage area 202 that contains the translated instruction corresponding to the current original instruction, as described below. Driver 310 then passes control to such address in translated instruction storage area 202 and such translated instruction is then executed.

The circumstance is now considered in which the current original instruction has not previously been processed by translator 100; that is, it has not previously been translated and optimized. Thus, there is no entry for such instruction in table 232 and comparator 315 returns control to driver 310 with an indication of this fact, such indication provided in accordance with known means. Alternatively, the current original instruction may previously have been translated and placed in translated instruction storage area 202, but such translation may have been deleted in order to preserve space in main memory 130 or for another reason.

Frequent Instruction Identifier 320

If there is no entry for the current original instruction in look-up table 232, driver 310 passes control to frequent instruction identifier 320. As noted, identifier 320 determines whether the current original instruction has been executed frequently; that is, in one embodiment, whether it has been executed more than a predetermined number of times in one or more predetermined intervals. Advantageously, frequently executed instructions are translated rather than emulated.

Emulation of an original instruction typically requires many more machine cycles than conventional execution of the original instruction by processor 105, perhaps ten times or a hundred times more cycles. The execution of translated instructions also typically requires more machine cycles than execution of the original instruction, but typically not as many cycles as emulation. Translated instructions may execute as quickly as, or faster than, the corresponding original instruction. Thus, translation of frequently executed instructions saves time as compared with emulation of such instructions. Infrequently executed instructions are generally not translated because the time required to make the translation, which typically is a one-time only event, offsets the savings of time as compared to emulation.

Also, while emulation is typically carried out for each occurrence of the original instruction, i.e., without creating a set of emulated instructions that will be stored for later use, translation is effectuated by creating a set of translated instructions that will be stored for later use. That is, with respect to the illustrated embodiment, once the emulated instructions are executed, they typically are no longer present in memory. In contrast, translated instructions are created and then stored in memory so that they may be executed repeatedly without being recreated. If infrequently executed instructions were translated, storage space in memory would have to be allocated for the resulting translated instructions. Because space in memory typically is limited, translation generally is undesirable with respect to infrequently executed instructions.

With respect to the operation of frequent instruction identifier 320, it is not material to the present invention what values are chosen to establish the predetermined number of executions or intervals. In the illustrated embodiment, each jump instruction has an arc counter, described below, that is incremented each time control passes through a corresponding arc of a jump instruction. Such counters typically are decremented, or reset to an initial value, at predetermined time intervals or at the occurrence of a predetermined event. Such predetermined event may be, for example, the processing by driver 310 or another element of translator 100 of a predetermined number of instructions. If a counter exceeds a predetermined value, referred to hereafter as the arc frequency threshold value, frequent instruction identifier 320 identifies its corresponding original instruction as one that has been executed frequently. In alternative embodiments, other techniques, including those now known or to be developed in the future, may be employed to determine whether an original instruction has been executed frequently.

Frequent instruction identifier 320 returns control to driver 310 with an indication, in accordance with known means such as the setting of a flag, whether the current original instruction has been executed frequently. If the indication is one of frequent execution, driver 310 passes control to original instruction translator 230 so that the current original instruction may be translated and optimized. Alternatively, if control returns to driver 310 with an indication that the current original instruction has not been executed frequently, driver 310 passes control to instruction emulator 340.

Emulator 340

As noted, emulator 340 emulates the current original instruction. That is, emulator 340 mimics the operations that processor 105 would have applied to the current original instruction if driver 310 had not taken control of the execution of the original instructions of executable file 170. However, rather than the current original instruction being executed, emulated instructions are executed. Such emulation takes place in accordance with any of a variety of known techniques using software, firmware, hardware, or a combination thereof. The results of the execution of such emulated instructions corresponding to the current original instruction generally are identical to the results that would have been obtained by the conventional execution of the current original instruction by processor 105. In addition, emulator 340 maintains and updates the stored copy of the machine state variables so that they are the same as they would have been if processor 105 had conventionally executed the current original instruction. Thus, as noted, emulator 340 may provide such updated values to processor 105 as initial conditions for resuming conventional execution if the operation of translator 100 is concluded or terminated.

In addition, emulator 340 determines whether the current original instruction is a jump instructions and, it is, records the execution of the jump (i.e., the passage of control through the arc determined by the jump instruction) in trace history table 212. Emulator 340 makes such determination in accordance with any of a variety of known techniques, such as by comparing the format or syntax of the current original instruction with a look-up table (not shown) containing the formats or syntactical rules applicable to known jump instructions. If emulator 340 determines that the current original instruction is not a jump instruction, then it returns control temporarily to driver 310 so that driver 310 may fetch the next original instruction. In an alternative embodiment, emulator 340 may fetch such subsequent original instruction directly. In the illustrated embodiment, driver 310 returns control to emulator 340, which determines whether such subsequent original instruction is a jump instruction.

Such process of examining subsequent original instructions typically continues in this manner until emulator 340 determines that the original instruction being processed is a jump instruction. As noted, the last instruction in an instruction block is illustratively assumed to be a jump instruction, which is the only jump instruction in the instruction block. However, in alternative embodiments, the last instruction need not be a jump instruction. Also, in alternative embodiments, an instruction block may include more than one jump instruction; i.e., it may include more than one basic block or instruction block as those terms are employed with respect to the illustrated embodiment. The illustrative assumptions of the illustrated embodiment are provided for clarity rather than limitation.

Thus, in the illustrated embodiment, if emulator 340 encounters a jump instruction, such instruction is determined to be the end of an instruction block. The instruction to which control passes from such jump instruction is a target instruction that begins another instruction block. Control therefore passes from the jump instruction of one instruction block, through an arc, to another instruction block. An arc that is taken as a result of a conditional fall-through is a "fall-through arc." A "jump arc" is an arc that is taken to an instruction that typically (but not necessarily) is one other than the next instruction in sequence (i.e., not the fall-through instruction).

If the current original instruction is a jump instruction, emulator 340 examines table 212 using any of a variety of known techniques such as search and compare techniques. Emulator 340 determines if there is an entry in table 212 for a unique identifier corresponding to the arc from the current original (jump) instruction to the target instruction to which control is transferred during the current execution of current original instruction. If there is no such match, emulator 340 creates such an entry and also creates and increments a unique counter in table 212 associated with such unique identifier. Such a counter hereafter is referred to as an "arc counter" because it counts the number of times that control passes through an arc from a jump instruction to a target instruction. Alternatively, if emulator 340 finds that table 212 does include a unique identifier for the arc, then it simply increments the corresponding arc counter. In either case, emulator 340 returns control to driver 310 so that driver 310 may fetch the next original instruction.

ORIGINAL INSTRUCTION TRANSLATOR 230

As noted, driver 310 passes control to original instruction translator 230 if the current original instruction is determined to be a frequently encountered instruction. Original instruction translator 230 identifies a hot trace containing the frequently executed original instruction, generates translated and optimized code for the hot trace, generates code to cause control to pass from the translated and optimized code to backpatcher 240, and stores the translated and optimized code in translated instruction storage area 202.

Figure 4:
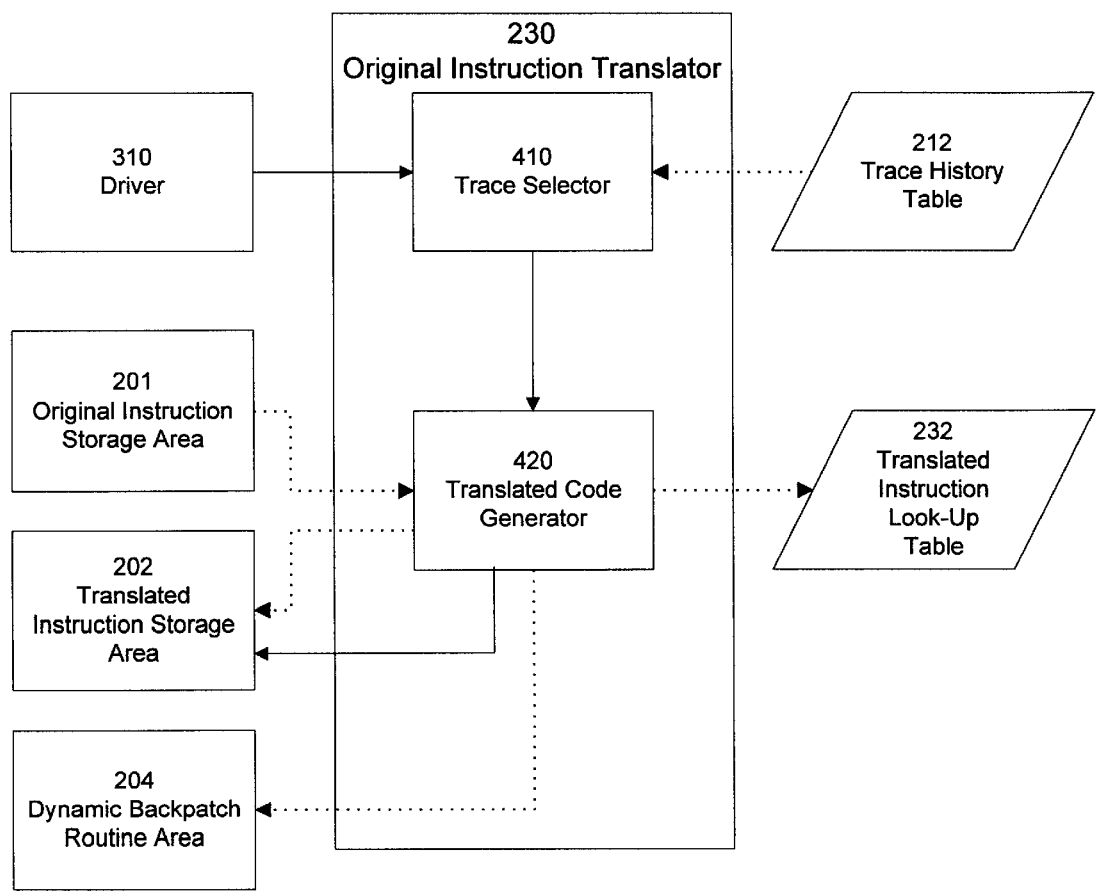
FIG. 4 is a functional block diagram of one embodiment of an original instruction translator of the multi-branch backpatching dynamic translator of FIG. 2, including its input and output connections to other elements of the multi-branch backpatching dynamic translator and of the computer system of FIG. 1.

The functions of original instruction translator 230 are shown in greater detail in FIG. 4. Original instruction translator 230 includes trace selector 410 that selects a hot trace for translation and optimization. As noted, a hot trace is a trace containing instruction blocks that are executed frequently. Original instruction translator 230 also includes translated code generator 420 that translates and optimizes the instructions of the hot trace and inserts code in the translated instructions to allow backpatcher 240 to backpatch jump instructions, including multi-branch-jump instructions.

Trace Selector 410

The operations of trace selector 410 in selecting a hot trace are now described with reference to FIGS. 5, 6A, and 6B. Trace selector 410 implements one of many techniques that may be used to select a hot trace, and it is not material to the present invention which of such techniques is used.

FIG. 5 is a symbolic representation of an illustrative group of instruction blocks connected by various control paths. The instructions within the illustrative group of instruction blocks 510, 520, 530, and 540, are represented by a target instruction (510-A, 520-A, 530-A, and 540-A, respectively), other instructions, if any (510-B, 520-B, 530-B, and 540-B, respectively), and a jump instruction (510-C, 520-C, 530-C, and 540-C, respectively). Such detail is not shown, but is assumed, for instruction blocks 502, 505, 508, 550, 560, 570, 580, and 590.

Figures 6A, 6B:
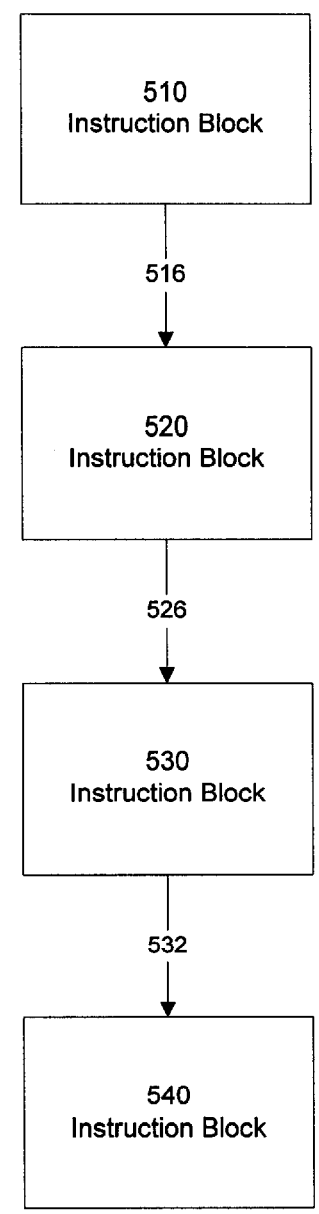
FIG. 6A is a portion of one embodiment of a trace history table showing illustrative values of arc counters for arcs between the instruction blocks of FIG. 5.
FIG. 6B is a symbolic representation of an exemplary hot trace composed of instruction blocks of FIG. 5 as determined by the table of FIG. 6A.

FIG. 6A represents a portion of trace history table 212 as it exists immediately prior to a determination by frequent instruction identifier 320 that one of the jump instructions of the illustrative instruction blocks of FIG. 5, jump instruction 510-C, is a frequently executed jump instruction. For illustrative purposes, it arbitrarily is assumed that the arc frequency threshold value for identifying a jump instruction as a frequently executed instruction is the integer 50. Referring to FIG. 5, the arc from instruction block 510, through jump instruction 514, to target instruction 522 of instruction block 520, is assigned by instruction emulator 340 a unique identifier, as noted above. For illustrative purposes, such unique identifier is arbitrarily assumed to be the label given to such arc in FIG. 5; that is, the integer 516. As shown in FIG. 6A, the arc counter corresponding to arc 516 has been incremented by instruction emulator 340 each time control has passed through such arc. It is not material whether the predetermined interval at which arc counters are decremented, for example, every 10,000 times that control passes through driver 310, has occurred. Whether or not the arc counters have been decremented, the arc counter for arc 516 has reached the arc frequency threshold value of 50. Thus, the next time that control passes through arc 516, such threshold will be exceeded if the predetermined interval has not been reached.

It is now assumed for illustrative purposes that control enters instruction block 510 through arc 504 for the 26th time. Instruction emulator 340 examines the instructions of instruction block 510, as described above, until encountering jump instruction 510-C. It will further be assumed that, in this occurrence of jump instruction 510-C, the conditional values of the jump instruction are such that control passes for the fifty-first time through arc 516. Instruction emulator 340 therefore increments the arc counter for arc 516 to the value 51 and passes control to frequent instruction identifier 320. Frequent instruction identifier 320 therefore determines that the arc counter for arc 516 has exceeded the arc frequency threshold value and jump instruction 510-C is designated as a frequently executed jump instruction. Driver 310 therefore passes control to trace selector 410 of original instruction translator 230. Trace selector 410 consults trace history table 212 to construct a hot trace.

In the illustrated embodiment, the hot trace begins with the instruction block that ends with the frequently executed jump instruction, i.e., instruction block 510 of the illustrative example. However, as stated above, many methods could be employed to determine the start and end of the hot trace, and it is not material to the present invention which method is used. For example, in an alternative embodiment, the hot trace may begin with the instruction block that begins with the target of the frequently executed jump instruction, i.e., instruction block 520. In the illustrated embodiment, the process of determining the end of the hot trace is carried out by selecting the most frequently traveled arc from instruction block 520, i.e., arc 526 (having an arc count of 48) rather than the less frequently traveled arc 528 (having an arc count of 2). The instruction block into which control passes through such most frequently traveled arc, i.e., instruction block 530, is designated as the next instruction block in the hot trace. The same process is applied to the arcs from instruction block 530, resulting in the designation of instruction block 540 as the next instruction block in the hot trace, and so on for subsequent arcs and instruction blocks.

If, however, any most frequently traveled arc from an instruction block in the hot trace has an arc count below a predetermined end-trace value, then, in the illustrated embodiment, trace selector 410 advantageously ends the trace at the instruction block having such arc. Thus, an instruction block connected to the hot trace by an infrequently traveled control path is not included in the hot trace.

If the jump instruction ending an instruction block includes an indirect jump instruction, then trace selector 410 also advantageously ends the trace at the instruction block having the indirect jump instruction. Trace selector 410 identifies an indirect jump instruction in accordance with any of a variety of known techniques, such as by comparing the format or syntax of the instruction with a look-up table (not shown) containing the formats or syntactical rules applicable to known indirect jump instructions. The target of a particular execution of an indirect jump may be any of a multiplicity of instructions, depending on the value(s) of a jump index or of other variables. Therefore, the ending of the trace at an indirect jump instruction avoids the need to maintain arc identifiers and counters for the potentially large number of arcs emanating from a single indirect jump instruction. Rather, if a basic block that includes the target instruction of an indirect jump instruction is frequently executed, an instruction block including that basic block typically will be identified as the start of another hot trace. Thus, the target instruction of an indirect jump instruction may be included in a hot trace although, in the illustrated embodiment, it typically will not be the same hot trace in which the indirect jump instruction is included. In an alternative embodiment, a trace may also be ended if a predetermined maximum number of instructions, or instruction blocks, have been included in the hot trace, or on other conditions.

Assuming for illustrative purposes that the end-trace value of the illustrated embodiment is the integer 35, the illustrated exemplary hot trace ends with instruction block 540 because all arcs from such block have an arc count below 35. As shown in FIG. 5, the last instruction in instruction block 540, instruction 540-C, is a multi-branch-jump instruction, as indicated by the multiple arcs from instruction block 540 to blocks 560-590. (In an embodiment in which an instruction block may have more than one jump instruction, multiple exits could also be achieved by a cascade of conditional, two-way, jump instructions, each having a jump arc and a fall-through arc.) Often, a multi-branch-jump instruction is, or includes, an indirect jump instruction. Thus, if jump instruction 540-C is an indirect jump instruction, the hot trace would have ended with instruction block 540 even if one of the arcs from instruction 540-C had an arc count of 35 or greater. FIG. 6B therefore represents the hot trace of the illustrative example, which consists of the original instructions represented by instruction blocks 510, 520, 530, and 540. Such hot trace is hereafter identified as the "current" hot trace, indicating that it is the hot trace upon which translator 100 currently is operating. Having selected the current hot trace, trace selector 410 passes control to translated code generator 420.

Translated Code Generator 420

Figure 7:
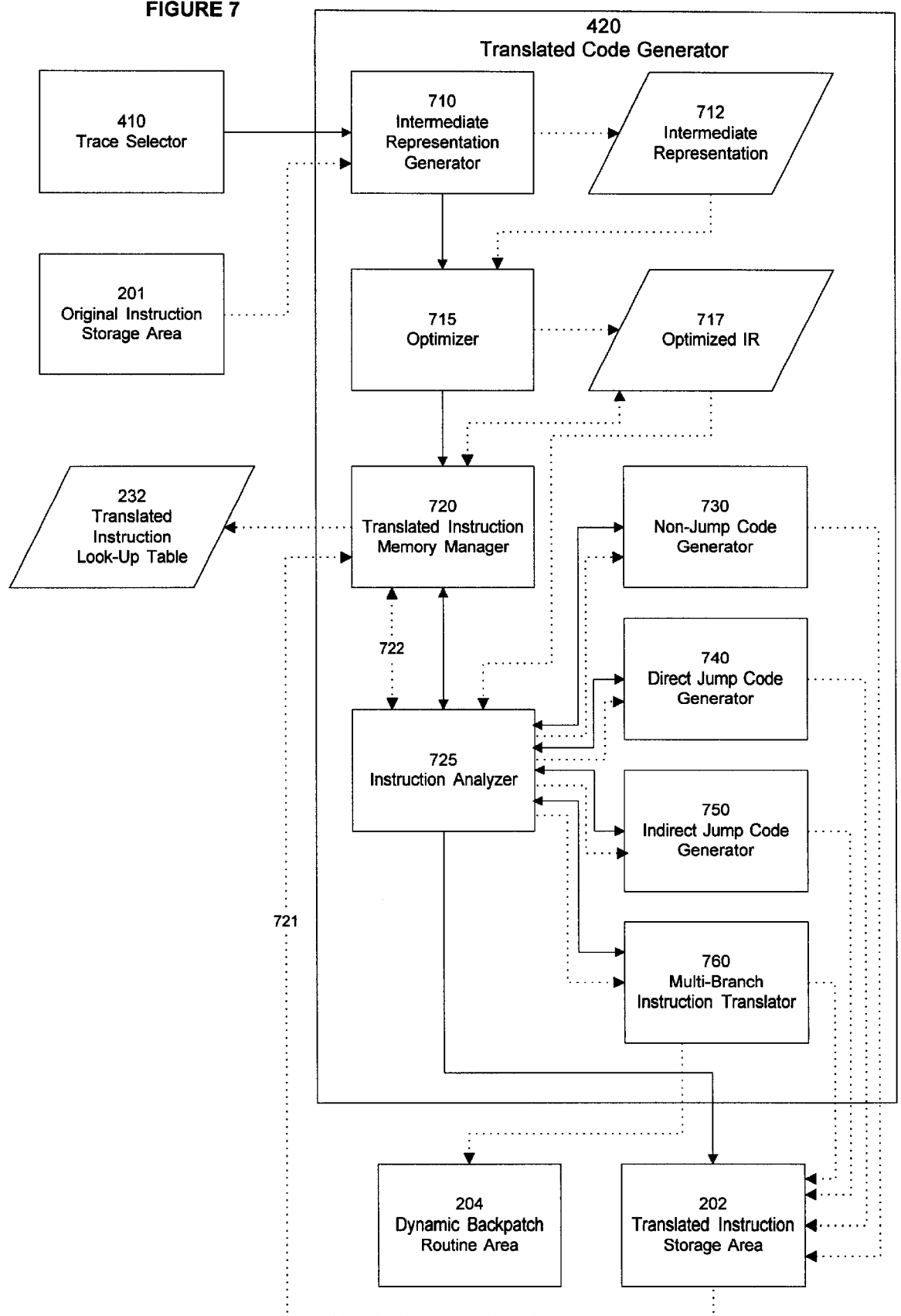
FIG. 7 is a functional block diagram of one embodiment of a translated code generator of the original instruction translator of FIG. 4, including its input and output connections to other elements of the original instruction translator, the multi-branch backpatching dynamic translator of FIG. 2, and the computer system of FIG. 1.

Translated code generator 420 translates and optimizes the instructions of the current hot trace and inserts code in the translated instructions to allow backpatcher 240 to backpatch jump instructions, including multi-branch-jump instructions. FIG. 7 is a functional block diagram of translated code generator 420. As shown in FIG. 7, translated code generator 420 includes intermediate representation generator 710 that assumes control from trace selector 410 and generates an intermediate representation (IR) 712 of the original instructions of the current hot trace. Translated code generator 420 also includes optimizer 715 that optimizes the intermediate representation. Also included in translated code generator 420 is translated instruction memory manager 720 that manages the storage of translated and optimized instructions in translated instruction storage area 202. Translated code generator 420 further includes instruction analyzer 725 that categorizes jump instructions of the translated and optimized instructions so that they may be further translated to facilitate backpatching. Also, instruction analyzer 725 determines whether a multi-branch-jump instruction, if included in the translated and optimized instructions, is suitable for multi-branch backpatching.

Intermediate Representation Generator 710 and Optimizer 715.

Intermediate Representation (IR) generator 710 accesses the original instructions of the current hot trace stored in original instruction storage area 201. IR generator 710 obtains the addresses of such original instructions in such storage area in accordance with any of a variety of known methods, such as searching a look-up table (not shown), which may be trace history table 212. The IR form facilitates the application of various known optimization techniques because, among other known factors, the current hot trace may be operated upon as a single block of code rather than non-contiguous instruction blocks linked by conditional jump instructions.

For example, assume for illustrative purposes that a hot trace contains an instruction block A (not shown) ending in a conditional jump instruction of the compare-and-jump-if-equal type. As is well known by those skilled in the relevant art, if the values to be compared by such instruction are not equal, control passes through the fall-through arc of the conditional jump instruction; i.e., to a target instruction that immediately follows the conditional jump instruction. If the values to be compared are equal, then such conditional jump instruction results in the passage of control through the jump arc of the conditional jump instruction. It is also illustratively assumed that the hot trace includes instruction block C (not shown) that is reached if the jump of the conditional jump instruction is taken, i.e., if the equality is true. Instruction block B (not shown) is not part of the hot trace and is the instruction block that is reached if the fall-through arc of the conditional jump instruction is taken, i.e., if the equality is not true. IR generator 710 typically translates the hot trace including blocks A and C by changing the conditional jump instruction so that the target of the jump arc becomes the target of a fall-through arc. That is, the compare-and-jump-if-equal instruction is translated to a compare-and-jump-if-not-equal instruction, and instruction block C becomes the target of the fall-through arc of the revised conditional jump instruction rather than the target of the jump arc of the original conditional jump instruction. Thus, instruction block C is moved to a position contiguous with instruction block A.

The foregoing, and other, known translation techniques generally facilitate the application of known optimization techniques, such as loop invariant code motion, common subexpression elimination, strength reduction, and many other techniques. Some of such techniques are described in Alfred V. Aho, Ravi Sethi, and Jeffrey D. Ullman, *Compilers: Principles, Techniques, and Tools* (Addison-Wesley Publishing Co.; 1988), pp. 598–602, which pages are hereby incorporated by reference. Optimizer 715 applies such known techniques, if applicable, to IR 712 to produce optimized IR 717.

Translated Instruction Memory Manager 720.

Translated instruction memory manager 720 typically assumes control from optimizer 715 and estimates the amount of space that will be required to store optimized IR 717, as further translated, in translated instruction storage area 202. Such further translation is described below in relation to the operations of code generators 730, 740, and 750, as well as translator 760. Typically, such further translation increases the number of instructions of optimized IR 717 by substantially less than 100 percent. Therefore, the amount of memory required to store the further translated instructions may typically be conservatively estimated to be two times the size of optimized IR 717. The method used to estimate the required storage space is not material to the present invention, and other methods to estimate or to reallocate storage will be evident to those skilled in the relevant art. Memory manager 720 allocates space for further translated instructions in translated instruction storage area 202 using any of a variety of known techniques, such as by maintaining a usage map (not shown) of translated instruction storage area 202. Such method is represented symbolically by information-flow line 721.

Instruction Analyzer 725.

Instruction analyzer 725 typically assumes control from translated instruction memory manager 720 and, as noted, categorizes jump instructions included in optimized IR 717 so that the jump instructions may be further translated to facilitate backpatching. Such further translation is undertaken in accordance with the type of jump instruction; i.e., in accordance with the category of jump instruction determined by analyzer 725. Such categories include direct jump instructions, indirect jump instructions that are not multi-branch-jump instructions (hereafter, simply indirect jump instructions), and multi-branch-jump instructions. In alternative embodiments, additional categories may be included, and/or those listed above may be combined or divided into subcategories. In the illustrated embodiment, analyzer 725 also provides instructions of optimized IR 717 to generators 730, 740, and 750, and translator 760, in accordance with the operations of those elements as described below.

Thus, for example, instruction analyzer 725 identifies a direct jump instruction in optimized IR 717, if such an instruction is present, by any of a variety of known techniques. Such known techniques include comparing the format or syntax of each instruction of optimized IR 717 with a look-up table (not shown) containing the formats or syntactical rules applicable to known direct jump instructions. If a direct jump instruction is identified, instruction analyzer 725 passes control to direct jump code generator 740 to perform the functions described below. Employing such known techniques, instruction analyzer 725 similarly identifies indirect jump instructions and multi-branch-jump instructions in optimized IR 717. If an indirect jump instruction is identified, control is passed to indirect jump code generator 750. If a multi-branch-jump instruction is identified, control is passed to multi-branch instruction translator 760. If analyzer 725 determines that an instruction is not a jump instruction of a type recognized by analyzer 725, control is passed to non-jump code generator 730. Control returns to instruction analyzer 725 after generators 730, 740, or 750, or translator 760, has completed its functions, which are described below. Analyzer 725 typically processes each instruction in optimized IR 717 in such manner. Such processing may be done sequentially with respect to each instruction in IR 717, in parallel, or in a combination thereof.

As noted, instruction analyzer 725 also performs an additional function with respect to multi-branch-jump instructions. Analyzer 725 determines whether such instructions, if present in optimized IR 717, are suitable for multi-branch backpatching. This function is now described in reference to FIG. 8A, which is a representation of an illustrative example of a portion of optimized IR 717.

FIG. 8A includes a multi-branch-jump instruction, which is labeled as instruction 8A-9. It will be understood that such instruction reference numbers in the left columns of FIG. 8A (as well as those in the left columns of FIGS. 8C–8D) are not part of the instructions, but are provided for convenience of reference only. Also, it will be understood by those skilled in the relevant art that the illustrative instructions of FIG. 8A (as well as those in FIGS. 8C–8D) are representative of functions performed by instructions according to known or future programming languages and do not necessarily conform to the format or syntax requirements of any known language.

As noted, instruction analyzer 725 identifies a multi-branch-jump instruction, such as instruction 8A-9, by any of a variety of known techniques. For example, analyzer 725 may compare the content, formats or syntax of instruction 8A-9 with a look-up table including allowable contents, formats, or syntactical rules applicable to multi-branch-jump instructions. Instruction analyzer 725 conducts additional analysis to further verify that a multi-branch-jump instruction appropriate for backpatching has been found. In particular, analyzer 725 determines (a) whether IR 717 includes instructions that perform the functions of range-verification and error-detection. Also, analyzer 725 determines (b) whether backpatching of the multi-jump instruction is reasonable in view of the amount of memory space that will be required. Analyzer 725 further determines (c) whether target instructions of the multi-branch-jump instruction are located in an appropriate portion of memory 130 or cache memory 140; that is, in the illustrated embodiment, whether the target instructions are located in original instruction storage area 201. Such determinations are now described in greater detail.

Range-verification instructions are executed prior to execution of the multi-branch-jump instruction for the purpose of verifying that the index variable is within upper and lower bounds. The difference between the upper and lower bounds is referred to herein as the range of the multi-branch-jump instruction. Analyzer 725 employs known techniques to identify a multi-branch-jump table of indirect or direct addresses through which control passes from the multi-branch-jump instruction. Analyzer 725 determines whether the range-verification instructions appropriately compare the range of the multi-branch-jump instruction to the size of the table. The range typically is the same as the number of instructions in the multi-branch-jump table since each such instruction is accessed by a unique value of the index variable. Generally, the range must not be greater than such number, or a jump will be directed to a memory location determined by the contents of an instruction outside the jump table.

Such determination of the existence of appropriate range-verification instructions is undertaken by any of a variety of known techniques, such as by comparing the format or syntax of the instructions with a look-up table (not shown) containing the formats or syntactical rules applicable to known instructions for comparing values. For example, instructions 8A-5 and 8A-7 indicate that register r7 is to be compared to the integers 0 and 4, respectively. Similarly, it will be evident to those skilled in the relevant art that instructions 8A-6 and 8A-8 are recognizable by comparison with known formats and syntactical rules for jump instructions. Typically, such jump instructions are provided following range-verification instructions to provide jumps to error detection code if the lower or upper bound of a multi-branch-jump instruction exceeds its expected value.

Having found range-verification and error-detection instructions preceding in execution the identified multi-branch-jump instruction, instruction analyzer 725 advantageously further determines whether the range is reasonable in relation to a predetermined, user-selected, or otherwise-determined indicator of reasonableness. To provide an arbitrarily chosen example, a range in excess of the integer 8,192 may be deemed to be unreasonably large. Such verification of range reasonableness is advantageous because, as described below, memory space typically is allocated for a backpatch table having a length generally equal to the range of the multi-branch-jump instruction. If such range is very large, then such backpatch table is very large and may require more memory space than is available or is desirable to dedicate to such use. The determination of the range may be made in accordance with any of a variety of known methods, such as assertion propagation.

Advantageously, instruction analyzer 725 also verifies that the instructions of the multi-branch-jump table are located within an appropriate region of main memory 130 or cache memory 140. In the example of instruction 8A-9, the addresses of the instructions of the multi-branch-jump table are represented, as is typical, by an index register multiplied by a word-length constant, the product of which is added to a base address. In instruction 8A-9, the word-length constant is 4, indicating, for example, that each instruction word consists of 4 bytes, typically of 8 bits each. It will be understood that it is immaterial to the present invention how the index register is represented or computed. In the illustrated example, the base address of the multi-branch-jump table is the address of the instruction having the label "TABLE." Thus, the target addresses of the multi-branch-jump instructions, i.e., the addresses of the instructions in the multi-branch-jump table, typically are calculated as offsets to the base address. As will be evident to those skilled in the relevant art, portions of main memory 130, for example, typically are available for execution in relation to executable file 170 and other portions typically are not so available. Employing any of a variety of known techniques, such as comparing the range of target addresses with a map (not shown) of permissible uses of main memory 130, instruction analyzer 725 determines whether the range of target addresses is confined to permissible portions of main memory 130. In the illustrated embodiment, such permissible portions are included in original instruction storage area 201.

If the range of target addresses is found to be included within original instruction storage area 201, then such target addresses are added by instruction analyzer 725 to optimized IR 717. Instruction analyzer 725 transfers control to memory manager 720 to allocate additional space, if necessary, in translated instruction storage area 202 to accommodate the range of target addresses so added to optimized IR 717, and control returns to instruction analyzer 725. Instruction analyzer 725 analyzes each identified multi-branch-jump instruction of optimized IR 717 in the manner described above. In alternative embodiments, one or more of the determinations described with respect to analyzer 725 may be omitted, and such steps may be combined, subdivided, and conducted sequentially in any order, or in parallel.

Instructions in optimized IR 717 that are not identified by instruction analyzer 725 as either a direct jump, an indirect jump, or a multi-branch-jump instruction appropriate for backpatching, are identified by instruction analyzer 725 as non-jump instructions. In the illustrated embodiment, the determinations described above begin with the first instruction of optimized IR 717 and proceed sequentially to the last such instruction, although it need not be so in other embodiments.

Non-Jump Code Generator 730.

For illustrative purposes, it is assumed that instruction analyzer 725 operates upon the representative group of instructions of optimized IR 717 that are shown in FIG. 8A. In the manner described above, analyzer 725 determines that the first instruction in this representative group, i.e., instruction 8A-1, is a non-jump instruction. Analyzer 725 therefore passes control to non-jump code generator 730.

Non-jump code generator 730 generates an instruction that, in the illustrated embodiment, is identical to the corresponding non-jump instruction in optimized IR 717. Generator 730 stores the generated instruction as the first instruction in the portion of translated instruction storage area 202 allocated by memory manager 720 for storage of the current hot trace. Such instruction is shown as instruction 8B-1 of FIG. 8B, which is a representation of instructions in translated instruction storage area 202. Non-jump code generator 730 provides to instruction analyzer 725, which in turn provides to memory manager 720, the number of instructions that have been used in translated instruction storage area 202. Memory manager 720 provides instruction analyzer 725 with the address of the next available location for storing instructions in storage area 202, which information is provided to non-jump code generator 730.

Such exchange of information regarding storage of instructions in translated instruction storage area 202 is represented by information-flow line 722, and similarly occurs with respect to the operations of generators 740 and 750, as well as translator 760, as described below. Memory manager 720 typically creates a record in translated instruction look-up table 232 for each translated and optimized instruction inserted by generators 730, 740, or 750, or by translator 760, in translated instruction storage area 202. Each such record includes a field for the address of the translated and optimized instruction in translated instruction storage area 202, and a field for the unique identifier (the address in the illustrated embodiment) of the corresponding original instruction in original instruction storage area 201. In other embodiments, such record need not be made for every such translated and optimized instruction. For example, the beginning and ending of instruction blocks may be so recorded, or another method used that will provide an original address in original instruction storage area 201 for translated and optimized instructions in translated instruction storage area 202 that are targets of direct jump instructions or multi-branch-jump instructions.

Non-jump code generator 730 returns control to instruction analyzer 725 so that the second instruction in optimized IR 717 may be analyzed. In the illustrative example shown in FIG. 8A, instruction 8A-2 also is a non-jump instruction and thus is processed in the same manner as instruction 8A-1.

Direct Jump Code Generator 740.

Instruction analyzer 725 analyzes instruction 8A-3 of the illustrative example and determines, in the manner described above, that it is a direct jump instruction. That is, if the condition of the comparison in the preceding instruction 8A-2 is true (the value in register 3 is greater than the value in register 4), then control passes through a jump arc to the instruction at the target address represented by LABEL3. Because the intermediate representations of IR 712 and optimized IR 717 are derived from the original instructions of the current hot trace, as described above, such target address LABEL3 is an address in original instruction storage area 201. The address LABEL3 typically is represented as an offset from a base address in such storage area, but it need not be so. Having identified instruction 8A-3 as a direct jump instruction, instruction analyzer 725 passes control to direct jump code generator 740.

Direct jump code generator 740 preserves the original instruction target address of the direct jump instruction and provides that such address will be dynamically backpatched if control passes through the direct jump instruction. In particular, generator 740 generates instructions to provide the original instruction target address, and to provide control, to instructions that will implement backpatching if control passes through the direct jump instruction to a previously translated target instruction. Generator 740 inserts such generated instructions into translated instruction storage area 202. As will be described below, such passage of control conditionally occurs, if control passes through the direct jump, because instruction analyzer 725 transfers control to translated instruction storage area 202 after all instructions of optimized IR 717 have been processed.

An illustrative example of such code inserted into translated instruction storage area 202 by direct jump code generator 740 is represented by instructions 8B-3 through 8B-5 of FIG. 8B. The condition of the original branch is reversed in instruction 8B-3 and the target is set to the translation of the next original instruction, thereby branching around the new instructions 8B-4 and 8B-5. Instruction 8B-4 is representative of one of many types of known instructions that may pass a value, in this example, the value LABEL3 containing the target address, to the target of jump instruction 8B-5. The value DIRBP in instruction 8B-5 is the beginning address of direct jump backpatcher 1010 of backpatcher 240, the functions of which are described below.

Advantageously, such operation of providing for future transfer of control to direct jump backpatcher 1010, if control passes through jump instruction 8B-5, avoids the expenditure of time needed to backpatch a jump that may not be taken. Such provision for backpatching conditioned on actual execution of a jump rather than on the presence of a jump instruction that may or may not be executed (or conditioned on actual execution of a particular jump arc in a multi-branch-jump instruction, as described below in relation to translator 760) is referred to herein as "as-needed backpatching" and grammatical variants thereof. In other embodiments, backpatching could alternatively be undertaken by direct jump code generator 740, or control could be transferred to direct jump backpatcher 1010 for such purpose. That is, backpatching need not be on an "as-needed" basis in alternative embodiments.

Indirect Jump Code Generator 750.

Instruction analyzer 725 analyzes instruction 8A-4 of the illustrative example of FIG. 8A and determines, in the manner described above, that it is an indirect jump instruction. That is, if the condition of the comparison of instruction 8A-2 is true (the value in register 3 is equal to or less than the value in register 4), then control passes through a jump arc to the instruction at the target address in original instruction area 201 represented by the contents of register 5. Also as described above, instruction analyzer 725 determines that this indirect jump instruction is not an indirect, multi-branch-jump instruction. Instruction analyzer 725 therefore passes control to indirect jump code generator 750.

Indirect jump code generator 750 preserves the original instruction target address of the indirect jump instruction and provides such address, and control, to driver 310 if control passes through the indirect jump. In particular, generator 750 generates instructions to perform such operations and inserts such generated instructions into translated instruction storage area 202. Such inserted code is represented by instructions 8B-6 through 8B-8. Instruction 8B-7 passes the value held by register 5 at the time of execution of instruction 8B-7, which is the target address of the indirect jump instruction. The value DRIVER in instruction 8B-8 is the beginning address of driver 310. The target address of the indirect jump is not backpatched because such target address may vary from one execution of the indirect jump to another, depending on the value held in register 5 at the time of execution. Thus, it is provided in instruction 8B-8 that control will be returned to driver 310 so that it may process the indirect jump instruction as described above, if control passes to such indirect jump instruction.

Instruction analyzer 725 analyzes instructions 8A-5 and 8A-6 of the illustrative example of FIG. 8A and determines that such instructions are non-jump and direct jump instructions, respectively. In the manner described above, corresponding instructions are placed in translated instruction storage area 202 by non-jump code generator 730 and direct jump code generator 740, respectively. These corresponding instructions are represented by instructions 8B-9, and by instructions 8B-10 through 8B-12, respectively, of FIG. 8B. The same operations are carried out with respect to instructions 8A-7 and 8A-8, and the results are shown in instructions 8B-13 through 8B-16.

Multi-branch Instruction Translator 760.

Instruction analyzer 725 analyzes instruction 8A-9 of the illustrative example of FIG. 8A and determines, in the manner described above, that such instruction is a multi-branch-jump instruction. Control is therefore passed to multi-branch instruction translator 760. The multi-branch-jump instruction currently being processed by translator 760, such as instruction 8A-9 of the illustrative example, is hereafter referred to as the "current multi-branch-jump instruction."

Multi-branch instruction translator 760 generates translated instructions that, when executed, direct control to backpatching instructions that dynamically backpatch multi-branch-jump instructions. In particular, translator 760 generates a translated table, referred to herein as the backpatch table, to hold the addresses of targets of a translation of the current multi-branch-jump instruction in translated instruction storage area 202 (referred to hereafter as "translated target addresses"). Translator 760 also generates code to dynamically backpatch such translated target addresses into such backpatch table, and generates the translation of the current multi-branch-jump instruction. Advantageously, such code in the illustrated embodiment provides for as-needed backpatching.

Also advantageously, such backpatched translated target addresses typically provide substantially faster transfer of control from a translated multi-branch-jump instruction to its targets than typically is provided by alternative methods. Such alternative methods include transferring control from the translated multi-branch-jump instruction to a driver or similar element for determining the original target address; finding a corresponding translated target address, if any; and transferring control to such translated target address. Another alternative method that typically is much slower than that provided by multi-branch instruction translator 760 is to transfer control from the translated multi-branch-jump instruction to a driver or similar element that then emulates the execution of the original target instruction. Yet another alternative method is to transfer control from the translated multi-branch-jump instruction to processor 105 to execute the original instruction. However, such method requires that control be regained by the dynamic translator if it is to dynamically translate and optimize the remaining instructions of the executable file, and such giving up and regaining of control typically requires many machine cycles to accomplish.

Figure 9:
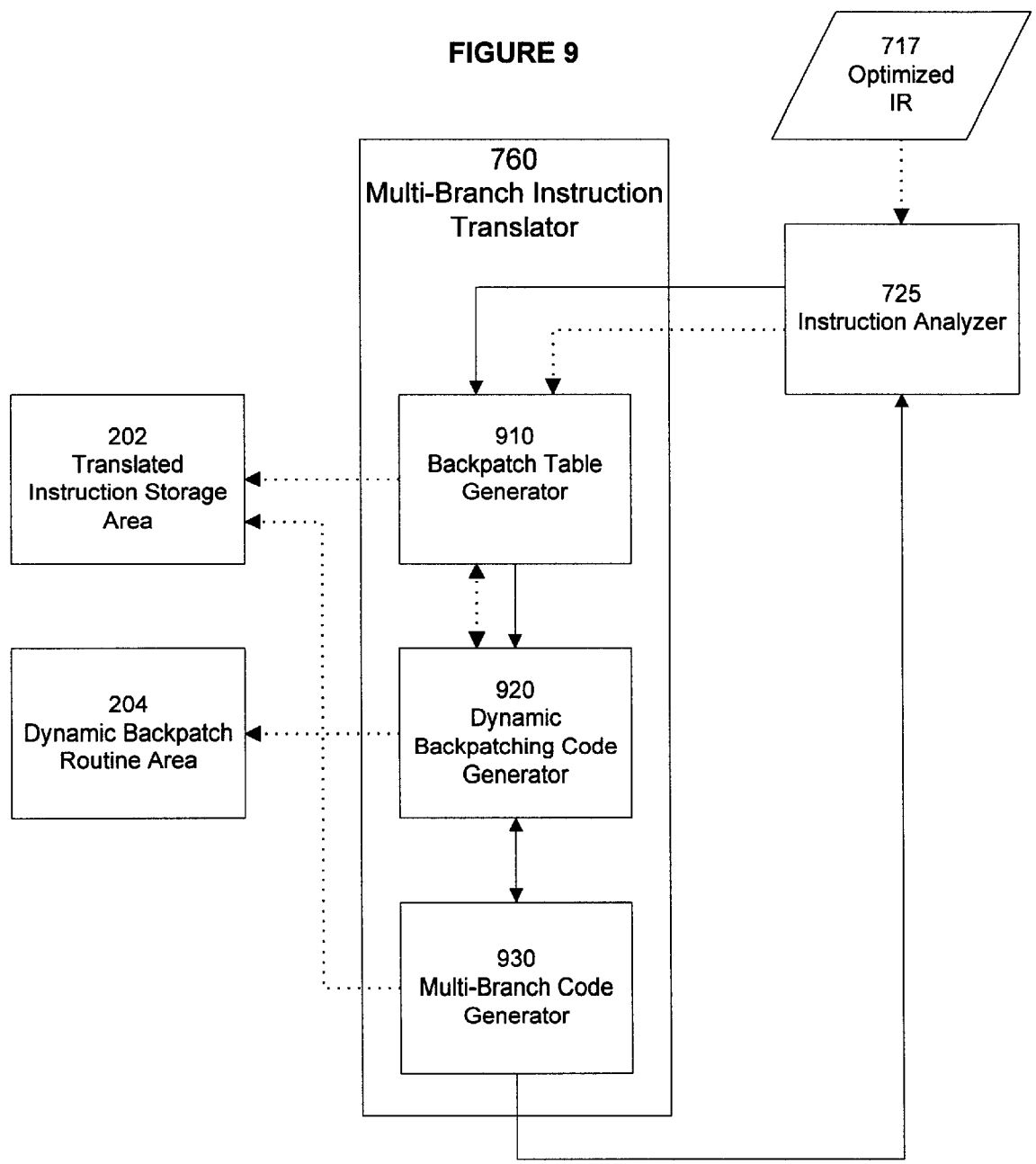
FIG. 9 is a functional block diagram of one embodiment of a multi-branch-jump instruction translator of the translated code generator of FIG. 7, including its input and output connections to other elements of the translator-optimized code generator and the computer system of FIG. 1.
Figure 10:
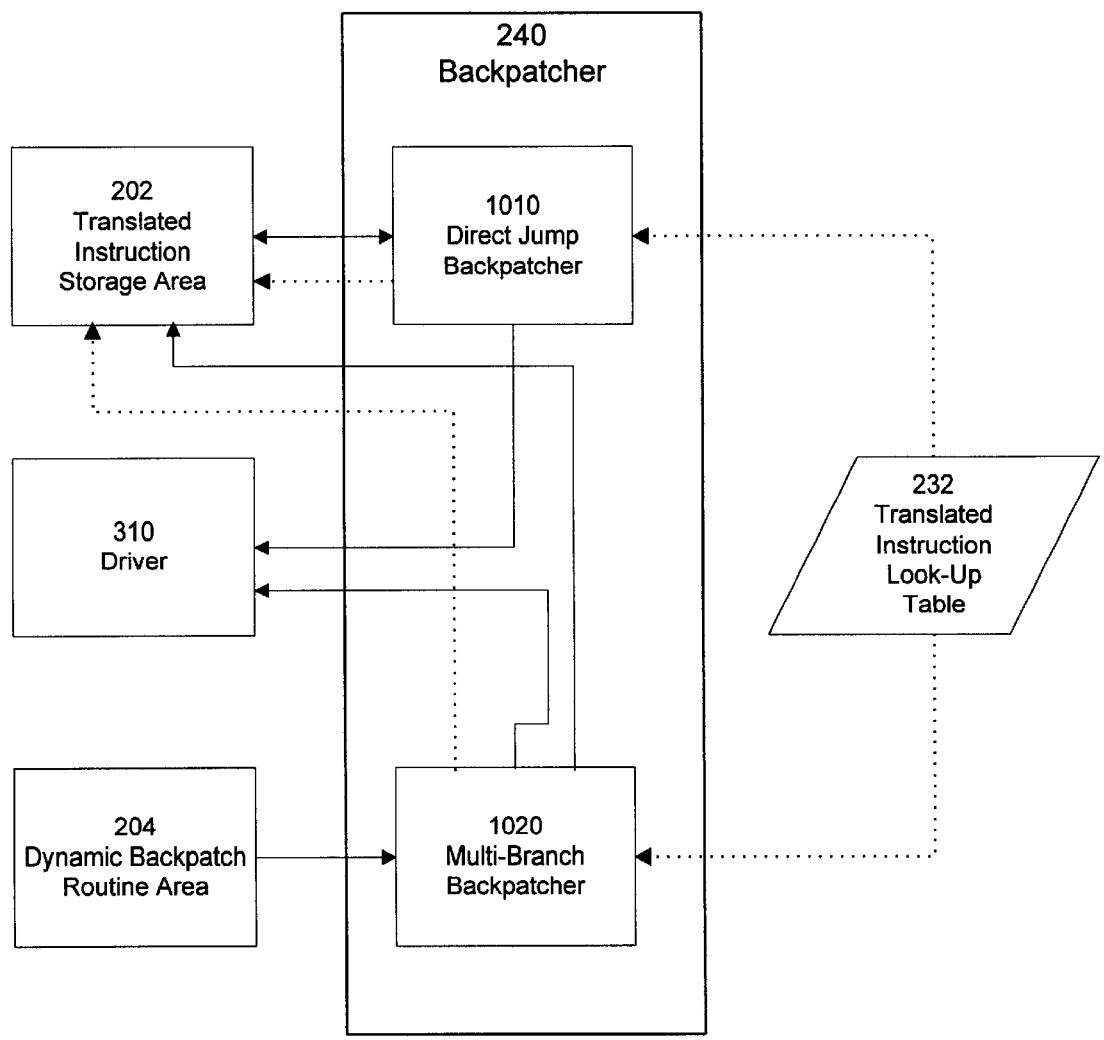
FIG. 10 is a functional block diagram of one embodiment of a backpatcher of the multi-branch backpatching dynamic translator of FIG. 2, including its input and output connections to other elements of the multi-branch backpatching dynamic translator and of the computer system of FIG. 1.

The functions of multi-branch instruction translator 760 are shown in greater detail in the functional block diagram of FIG. 9. Multi-branch instruction translator 760 includes backpatch table generator 910 that generates a backpatch table for storing translated target addresses of each multi-branch-jump instruction on an as-needed basis. Translator 760 also includes dynamic backpatching code generator 920 that generates dynamic backpatching code specific to each backpatch table generated by backpatch table generator 910. Further included in translator 760 is multi-branch code generator 930 that translates multi-branch-jump instructions by changing the base address for the table of the original, indirect, multi-branch-jump instruction into the base address of the backpatch table.

Backpatch table generator 910: As noted, backpatch table generator 910 generates a backpatch table for storing translated target addresses of each multi-branch-jump instruction on an as-needed basis. Advantageously, such backpatch table is generated and initialized once for each multi-branch-jump instruction that is operated upon by generator 910. Such initialization provides that all indirect-address entries in the table initially direct control to dynamic backpatching instructions specific to the multi-branch-jump instruction. Such specific instructions are generated by dynamic backpatching code generator 920. As described below, multi-branch backpatcher 1020 replaces an initial entry in the backpatch table with a translated target address on an as-needed basis. That is, if the branch of the translated multi-branch-jump instruction having the entry as an indirect target address is executed, and the target address pointed to by the indirect target address is part of a previously translated trace, then such translated target address is stored in the backpatch table.

In the illustrated embodiment, the number of instructions in the backpatch table (hereafter, the "current backpatch table") is the same as the number of, and correspond with, instructions in the multi-branch-jump table of the current multi-branch-jump instruction (hereafter, the "current multi-branch-jump table"). For example, instructions 8B-18 through 8B-21 of FIG. 8B represent the instructions of the current backpatch table as generated by backpatch table generator 910 and stored in translated instruction storage area 202. Instructions 8A-10 through 8A-13 of FIG. 8A represent the instructions of the current multi-branch-jump table. In accordance with any of a variety of known techniques, backpatch table generator 910 obtains from dynamic backpatching code generator 920 a range of available address in dynamic backpatch routine area 204 in which generator 920 may store the dynamic backpatching code that it generates, as described below.

The first address in this range is represented in FIGS. 8B and 8C by the label "PATCH1." Backpatch table generator 910 initializes the current backpatch table by storing such address in all entries (i.e., instructions) instructions of the table. Generator 910 stores the initialized table in translated instruction storage area 202. For example, each instruction of the current backpatch table consisting of instructions 8B-18 through 8B-21 is translated to contain the address PATCH1. Thus, all indirect jumps through multi-branch-jump instruction 8B-17 pass control to the dynamic backpatching code for the current multi-branch-jump instruction beginning at the label PATCH1 in dynamic backpatch routine area 204 (hereafter referred to as the "current dynamic backpatching code"). Backpatch table generator 910 passes control to dynamic backpatching code generator 920.

Dynamic backpatching code generator 920: Dynamic backpatching code generator 920 advantageously generates specific dynamic backpatching code for the backpatch table of each multi-branch instruction processed by multi-branch instruction translator 760. For example, FIG. 8C is a representation of an illustrative example of current dynamic backpatching code that is specific to the backpatch table of the current multi-branch-jump instruction represented by instruction 8B-17. Typically, the dynamic backpatching code for such a multi-branch-jump instruction is generated when such instruction is first operated upon by generator 920, and thus need not be again generated if such instruction is again operated upon by generator 920. Thus, generator 920 determines, in accordance with any of a variety of known techniques, whether it has previously generated dynamic backpatching code for a multi-branch-jump instruction.

The advantage of generating dynamic backpatching code specific to each such multi-branch-jump instruction is to provide for repeated usage of such code for a particular branch of the current multi-branch-jump instruction as control passes through it during subsequent executions of such instruction. Such repeated usage is typically employed with respect to as-needed backpatching because branches are backpatched only as they are executed. Thus, the use of specific dynamic backpatching code avoids the need to repeatedly generate such code for each branch of a multi-branch-jump instruction in as-needed backpatching. In alternative embodiments, such as embodiments in which as-needed backpatching is not employed, instruction-specific dynamic backpatching code need not be used.

As noted, the beginning address of the current dynamic backpatching code is represented by the label PATCH1. Thus, instruction 8C-1 of FIG. 8C is located at the address represented by the label PATCH1. Dynamic backpatching code generator 920 stores in such address an instruction that preserves the value of the label TABLE so that, in accordance with known techniques, it will be available to the target of jump instruction 8C-4. The label TABLE represents the base address in original instruction storage area 201 of the current multi-branch-jump table, as represented by instruction 8A-10. Instruction 8C-2 similarly preserves the value of the label BPTABLE. The label BPTABLE represents the base address in translated instruction storage area 202 of the current backpatch table, as represented by instruction 8B-14. Similarly, instruction 8C-3 preserves the value of the index register r7. It will be understood by those skilled in the relevant art that the order of the preceding three instructions is not material. Jump instruction 8C-4 transfers control to multi-branch backpatcher 1020, the beginning address of which is represented by the label MBB.

As noted, generator 920 stores instructions 8C-1 through 8C-4 in dynamic backpatch routine area 204. In alternative embodiments, such specific dynamic backpatching code may be stored in translated instruction storage area 202, or any other part of main memory 130, or in cache memory 140. However, such dynamic backpatching code advantageously is stored in a distinct location, such as dynamic backpatch routine area 204, so that the space that it occupies may more readily be overwritten after backpatcher 240 has been invoked to backpatch all of the targets of the translated multi-branch-jump instruction, as described below.

Multi-branch code generator 930: Generator 930 translates the current multi-branch-jump instruction, such as is illustratively represented by instruction 8A-9. Such translation is accomplished by changing the base address for the table of the current multi-branch-jump instruction, represented by the label TABLE in the illustrative example, to the base address of the current backpatch table, represented by the label BPTABLE in the illustrative example. Such translated multi-branch-jump instruction is stored by generator 930 in translated instruction storage area 202, as represented by instruction 8B-17.

BACKPATCHER 240

Instruction analyzer 725 processes each instruction of the current hot trace in the manner described above. Instruction analyzer 725 then transfers control to the first translated instruction of the current hot trace in translated instruction storage area 202. In the illustrative example, control is thus passed to instruction 8B-1 so that the current hot trace is executed. If control passes to a direct jump instruction, or to a multi-branch-jump instruction, then, as described above, control is passed by such translated instruction of the current hot trace to direct jump backpatcher 1010 (having the beginning address represented by DIRBP in the illustrative example) or to multi-branch backpatcher 1020 (having the beginning address represented by MBB in the illustrative example), respectively. Advantageously, backpatching thus is undertaken by backpatcher 240 on an as-needed basis.

Direct Jump Backpatcher 1010

Direct jump backpatcher 1010 backpatches direct-jump target addresses in original instruction storage area 201 by substituting therefor the corresponding translated target address. Thus, control passes from one instruction in translated instruction storage area 202 to another such instruction, rather than returning to driver 310. Advantageously, such backpatching is accomplished in the illustrated embodiment on an as-needed basis. The operations of direct jump backpatcher 1010 are more particularly described with respect to the illustrative example of instructions 8B-5 of the exemplary current hot trace of FIG. 8B. It is thus assumed that non-jump instructions 8B-1 through 8B-2 have been executed, and that the condition of jump instruction 8B-3 is not satisfied so that control passes to direct jump backpatcher 1010.

As noted above with respect to instruction 8B-4, direct jump backpatcher 1010 has available to it the target address in original instruction storage area 201 (referred to hereafter as the original target address) of the jump instruction in optimized IR 717 (i.e., instruction 8A-3) from which instructions 8B-4 and 8B-5 were translated. Direct jump backpatcher 1010 determines, using any of a variety of known techniques, such as search and compare techniques, whether such original target address has been entered by memory manager 720 in translated instruction look-up table 232. As described above, the existence of such an entry indicates that such original target address was part of a hot trace that previously has been translated and optimized and stored in translated instruction storage area 202.

If such an entry is found, direct jump backpatcher 1010 backpatches the call to DIRBP with a jump to the translated target address. Thus, as noted, control passes from one instruction in translated instruction storage area 202 to another such instruction, rather than returning to driver 310. Specifically, with respect to the illustrative example, direct jump backpatcher 1010 finds an entry in look-up table 232 having the original address corresponding to the value of the label LABEL3. Corresponding to this original address in look-up table 232 is an address in translated instruction storage area 202 that is illustratively represented herein by the label TR_LABEL3. Direct jump backpatcher 1010 therefore substitutes in translated instruction storage area 202 the instruction "JMP TR_LABEL3" for the instruction "CALL DIRBP". Such backpatched instruction is represented by instruction 8D-5 of FIG. 8D. FIG. 8D represents the translated current hot trace after some of the target addresses in FIG. 8B have been backpatched by backpatcher 1010 or backpatcher 1020.

Because the value of LABEL3 is no longer required, instruction 4 of FIG. 8B may be eliminated, in accordance with known means. For convenience of illustration, an alternative technique of substituting a no-operation (NOP) instruction is represented by instruction 4 of FIG. 8D. Direct jump backpatcher 1010 then passes control to the address TR_LABEL3 in translated instruction storage area 202.

For further illustration, it is now assumed that direct jump backpatcher 1010 does not find a record having an entry in the original instruction identifier field in look-up table 232 corresponding to the original target address represented by the label LABEL3. The lack of such entry indicates that such target address has not been part of a hot trace previously translated and optimized. Instructions 4 and 5 of FIG. 8B therefore are not changed, and direct jump backpatcher 1010 passes control, with a PUSH argument or similar instruction preserving the value of LABEL3, to driver 310. Instructions 11 and 12, and 15 and 16, of FIG. 8D represent such occurrences of a failure to find an entry in look-up table 232. Such failure indicates that control has not frequently passed through the jump arcs of direct jump instructions 9 or 12; that is, that the value of the index register r7 has not frequently been found to be out of range and thus that control has not frequently passed to the error detection code beginning at the address represented by the label ERROR.

Multi-Branch Backpatcher 1020

To provide further illustration, it is now assumed that control has passed to instruction 8B-17. That is, it is assumed that the conditions of the previous jump instructions have not been satisfied. Multi-branch-jump instruction 8B-17 causes control to pass to the address determined by the value of the bracketed algebraic expression "[r7*4+ BPTABLE]." For illustrative purposes, it arbitrarily is assumed that the value of the index register r7 is the integer 2. The algebraic expression thus adds the length of two addresses (each typically having a length of four bytes) to the base address of the backpatch table, which is represented by the label BPTABLE.

Control therefore passes to the third address in the table, which is at location 8B-20. Instruction 8B-20 contains the address PATCH1, indicating that the jump of instruction 8B-17 is an indirect one, i.e., through location 16 to the address represented by the label PATCH1. As noted, such indirect jump passes control to instruction 8C-1, which is located in dynamic backpatch routine area 204. As also noted, execution of this dynamic backpatching code represented by instructions 8C-1 through 8C-4 results in the transfer of control to multi-branch backpatcher 1020, together with arguments preserving the values of the beginning addresses of the original instruction table and the backpatch table, as well as the value of the index register r7. Thus, if the translated current hot trace stored in translated instruction storage area 202 (as illustratively represented by FIG. 8B) is executed, and if instruction 8B-17 of such hot trace is executed so that control passes through the multi-branch, indirect, jump to the PATCH1 dynamic backpatching code in dynamic backpatch routine area 204, then control will pass to multi-branch backpatcher 1020.

Multi-branch backpatcher 1020 backpatches entries in the multi-branch-jump table of a translated multi-branch-jump instruction so that control passes directly from such entries to translations, if present, of the instructions pointed to by such entries. Multi-branch backpatcher 1020 accomplishes such function by backpatching, on an as-needed basis, addresses in the current backpatch table that pass control to the dynamic backpatching code for the current multi-branch-jump instruction. Such indirect addresses are replaced by pointers to the translated target instructions. Thus, control passes from one instruction in translated instruction storage area 202 to another such instruction, rather than returning to driver 310.

In particular, multi-branch backpatcher 1020 typically calculates the original target address of the present execution of current multi-branch-jump instruction 8B-17 (hereafter, the "original multi-branch jump target address") by multiplying the index register r7 by 4 and adding the result to the base original target address represented by the label TABLE. Other techniques for calculating such original target address may be employed in alternative embodiments. For the illustrative example in which index register r7 is equal to 2, the original multi-branch jump target address is represented by the label "address2" in instruction 8A-12.

Multi-branch backpatcher 1020 determines, using any of a variety of known techniques, such as search and compare techniques, whether such current original multi-branch jump target address has been entered by memory manager 720 into translated instruction look-up table 232. If there is such an entry, it will be assumed for illustrative purposes that the address in translated instruction area 202 corresponding to the original address represented by "address2" is represented by the label TR_ADD2. As noted, the existence of such an entry indicates that such address was part of a hot trace that previously has been translated and optimized and stored in translated instruction storage area 202.

If such an entry is found, multi-branch backpatcher 1020 advantageously backpatches the current backpatch table. FIG. 8D represents the backpatched version of the current hot trace of FIG. 8B. With reference to instruction 8D-20 of FIG. 8D, the current backpatch table is thus backpatched by substituting for the indirect address PATCH1 (as shown in the pre-backpatched instruction 8B-20) the indirect address TR_ADD2. Multi-branch backpatcher 1020 then passes control to the address TR_ADD2 in translated instruction storage area 202. Thus, multi-branch backpatcher 1020 advantageously provides for the future passage of control from one portion of translated instruction storage area 202 to another without returning to driver 310.

For further illustration, it is now assumed that multi-branch backpatcher 1020 does not find an entry in look-up table 232 corresponding to the original target address represented by the label "address2." The lack of such entry indicates that such target address has not been part of a hot trace previously translated and optimized. Location 8B-20 therefore is not backpatched, and multi-branch backpatcher 1020 passes control, with a PUSH argument preserving the value of address2, to driver 310.

Advantageously, the PATCH1 dynamic backpatching code of FIG. 8C is retained unless all the entries in the current backpatch table (i.e., locations 8B-18 through 8B-21) have been backpatched as illustratively described above with respect to instruction 8B-20. If such a complete backpatching occurs, the PATCH1 dynamic backpatching code is dead code, i.e., there is no path through which control may reach it, and it may therefore be eliminated. In one embodiment, multi-branch backpatcher 1020 detects such complete backpatching by examining each indirect address instruction in the backpatch table to determine if each such instruction has a value that is not in dynamic backpatch routine area 204, or by another technique employing known procedures.

If such complete backpatching is detected, multi-branch backpatcher 1020 passes control to dynamic backpatching code generator 920 so that it may make available the space occupied by such dead backpatching code. Control is then returned to multi-branch backpatcher 1020 so that it may pass control to the address in translated instruction storage area 202, such as TR_ADD2 in the illustrative example, that it backpatched into the current backpatch table.

Having now described one embodiment of the present invention, it should be apparent to those skilled in the relevant art that the foregoing is illustrative only and not limiting, having been presented by way of example only. Many other schemes for distributing functions among the various functional elements of the illustrated embodiment are possible in accordance with the present invention. The functions of any element may be carried out in various ways in alternative embodiments. For example, numerous variations are contemplated in accordance with the present invention to identify frequently executed instructions and hot traces; record control flow through hot traces; translate, instrument, profile, optimize, or otherwise process translated instructions; manage memory usage; categorize jump instructions; generate translations of such jump instructions; pass variables; construct backpatching tables; and generate dynamic backpatching code.

The system, method, and product described above are intended to be applicable to commercial systems such as might be used for backpatching multi-branch-jump instructions in a dynamic optimizer. The present invention is also applicable to backpatching multi-branch-jump instructions in a dynamic translator used for purposes other than optimization, such as cross-platform translation, instrumentation, profiling, and other alterations of executable files without the need to recompile such files.

There are many possible variations of the architecture for the data structures described above, including trace history table 212 and translated instruction look-up table 232. It will be evident to those skilled in the relevant art that such, and other, data structures may be stored in main memory 130, or one or more could be stored in cache memory 140, memory storage device 150, or another device for storing data. As also will be evident to those skilled in the relevant art, the values in data structures generally are initialized or re-initialized in accordance with any of a variety of known techniques to provide that such values are accurate. Such initializations or re-initializations of data structures therefore are assumed, but may not be further described, with respect to the various data structures, including flags, of the illustrated embodiment or alternative embodiments. Similarly, memory storage areas, such as original instruction storage area 201, translated instruction storage area 202, and dynamic backpatch routine area 204, are separately illustrated in the drawings for clarity, but, in other embodiments, may be combined, subdivided, and otherwise arranged. For example, area 204 may be included in area 202. Such storage areas may be in main memory 130, or one or more could be stored in cache memory 140, memory storage device 150, or another device for storing data, and they may be initialized and re-initialized in accordance with known techniques.

In addition, it will be understood by those skilled in the relevant art that control and data flows between and among functional elements of the invention and various data structures may vary in many ways from the control and data flows described above. More particularly, intermediary functional elements (not shown) may direct control or data flows; the functions of various elements may be combined, divided, or otherwise rearranged to allow parallel processing or for other reasons; intermediate data structures may be used; various described data structures may be combined; the sequencing of functions or portions of functions generally may be altered; and so on. As an additional, non-limiting, example, control flow to and from original instruction processor 210, and driver 310 in particular, may, in alternative embodiments, be accomplished directly between or among other functional elements of translator 100 without the involvement of original instruction processor 210. Also, direct control flow from a first instruction to a second instruction may alternatively be accomplished by indirect control flow from the first instruction to one or more intermediary instructions and thence to the second instruction. Numerous other embodiments, and modifications thereof, are contemplated as falling within the scope of the present invention as defined by appended claims and equivalents thereto.

What is claimed is:

1. A computer-implemented method for multi-branch backpatching in a dynamic translator used with an appropriate computing system having at least one memory storage unit having stored therein a plurality of original instructions of an executable file including a first multi-branch-jump instruction and one or more multi-branch-jump-table instructions each identifying an address of an original target instruction among the plurality of original instructions to which control transfers when control passes to each multi-branch-jump-table instruction from the first multi-branch-jump instruction, the method comprising:

(1) translating the first multi-branch jump instruction to provide a translated first multi-branch-jump instruction;

(2) translating a first of the multi-branch-jump-table instructions to provide a translated first multi-branch-jump-table instruction;

(3) determining when there exists a translated first target instruction that is a translation of a first original target instruction of the first multi-branch-jump-table instruction; and (4) when the translated first target instruction exists, backpatching the translated first multi-branch-jump-table instruction to provide that it passes control to the translated first target instruction.

2. The method of claim 1, wherein:

step (4) is done when control passes to the translated first multi-branch-jump-table instruction.

3. The method of claim 1, further comprising:

(5) identifying from the plurality of original instructions the first multi-branch-jump instruction; and (6) identifying from the plurality of original instructions the one or more multi-branch-jump-table instructions.

4. The method of claim 1, further comprising:

(5) tentatively identifying from the plurality of original instructions the first multi-branch-jump instruction, wherein the first multi-branch-jump instruction has a plurality of control paths leading from it;

(6) identifying from the plurality of original instructions the one or more multi-branch-jump-table instructions; and (7) verifying the first multi-branch-jump instruction upon determining that each control path from the first multi-branch-jump instruction leads to any one of the one or more multi-branch-jump-table instructions.

5. A computer system having at least one memory storage unit having stored therein a plurality of original instructions of an executable file including a first multi-branch-jump instruction and one or more multi-branch-jump-table instructions each identifying an address of an original target instruction among the plurality of original instructions to which control transfers when control passes to each multi-branch-jump-table instruction from the first multi-branch-jump instruction, the computer system further having a multi-branch backpatching dynamic translator comprising:

(1) a multi-branch instruction translator constructed and arranged to translate the first multi-branch jump instruction to provide a translated first multi-branch-jump instruction;

translate a first of the multi-branch-jump-table instructions to provide a translated first multi-branch-jump-table instruction;

determine when there exists a translated first target instruction that is a translation of a first original target instruction of the first multi-branch-jump-table instruction; and (2) a multi-branch backpatcher constructed and arranged to backpatch, when the translated first target instruction exists, the translated first multi-branch-jump-table instruction to provide that it passes control to the translated first target instruction.

6. The computer system of claim 5, wherein:

the multi-branch backpatcher backpatches the translated first multi-branch-jump-table instruction when control passes to the translated first multi-branch-jump-table instruction.

7. The computer system of claim 5, further comprising:

(3) an instruction analyzer constructed and arranged to identify, if present, the first multi-branch-jump instruction, and identify, if present, the one or more multi-branch-jump-table instructions.

8. The computer system of claim 5, wherein:

the first multi-branch-jump instruction has a plurality of control paths leading from it; and the instruction analyzer verifies the first multi-branch-jump instruction upon determining that each control path from the first multi-branch-jump instruction leads to any one of the one or more multi-branch-jump-table instructions.

9. The computer system of claim 5, wherein:

the multi-branch backpatcher backpatches the translated first multi-branch-jump-table instruction when an amount of available memory in the at least one memory unit is greater than a predetermined value.

10. The computer system of claim 5, wherein:

the multi-branch backpatcher backpatches the translated first multi-branch-jump-table instruction when an amount of available memory in the at least one memory unit is greater than a user-selected value.

11. The computer system of claim 5, further having at least one central processing unit (CPU), and wherein the multi-branch backpatching dynamic translator further comprises:

an original instruction processor constructed and arranged to (a) interrupt normal execution by the CPU, and (b) assume control over execution of the first original instruction.

12. The computer system of claim 11, wherein:

the original instruction processor further is constructed and arranged to (c) assign a unique identifier to the first original instruction.

13. The computer system of claim 11, wherein:

the original instruction processor further is constructed and arranged to (c) determine when there exists a translated instruction of the first original instruction, and (d) when the translated instruction of the first original instruction exists, direct control to it.

14. The computer system of claim 5, wherein the multi-branch backpatching dynamic translator further comprises:

(3) an original instruction processor constructed and arranged to (a) retrieve from the at least one memory unit a first original instruction, and (b) determine when the first original instruction is frequently executed.

15. The computer system of claim 14, wherein:

the original instruction processor further is constructed and arranged to (c) emulate, when the first original instruction is not frequently executed, the first original instruction and record the passage of control through it.

16. The computer system of claim 14, wherein:

the original instruction processor determines that the first original instruction is frequently executed when it is executed more than a predetermined number of times in a predetermined interval.

17. The computer system of claim 14, wherein:

the original instruction processor determines that the first original instruction is frequently executed when it is executed more than a predetermined number of times in a predetermined interval and is a jump instruction.

18. The computer system of claim 14, wherein:

the original instruction processor determines that the first original instruction is frequently executed when it is executed more than a predetermined number of times.

19. The computer system of claim 14, wherein:

the original instruction processor determines that the first original instruction is frequently executed when it is executed more than a predetermined number of times and is a jump instruction.

20. The computer system of claim 14, further comprising:

an original instruction translator constructed and arranged to
(a) receive the first original instruction from the original instruction processor when the first original instruction is frequently executed,
(b) identify a hot trace starting with a start-of-trace instruction and ending with an end-of-trace instruction having a trace control path in common with the start-of-trace instruction, and
(c) translate the hot trace.

21. The computer system of claim 20, wherein:

the original instruction translator further is constructed and arranged to
(d) dynamically optimize the translated hot trace.

22. The computer system of claim 20, wherein:

the frequently executed first original instruction is the start-of-trace instruction.

23. The computer system of claim 22, wherein:

the original instruction translator identifies the end-of-trace instruction when the original instruction translator follows the trace control path to an indirect jump instruction.

24. The computer system of claim 22, wherein:

control passes to the end-of-trace instruction through one or more arcs of the trace control path, starting with a first arc from the frequently executed first original instruction, a number of times that is greater than an end-trace value.

25. The computer system of claim 5, wherein the plurality of original instructions further include a first direct jump code instruction having a first direct jump target instruction having a first direct jump target address, and wherein the multi-branch backpatching dynamic translator further comprises:
(3) a direct jump code generator constructed and arranged to
determine when there exists a translated first direct jump target instruction that is a translation of the first direct jump target instruction,
determine a translated first direct jump target instruction address that is an address of the translated first direct jump target instruction,
translate, when the translated first direct jump target instruction exists, the first direct jump code instruction to provide a translated first direct jump code instruction, and
(4) a direct jump backpatcher constructed and arranged to
receive control from the translated first direct jump code instruction,
obtain from the direct jump code generator the translated first direct jump target address, and
backpatch, when the translated first direct jump code instruction is executed, the translated first direct jump code instruction to provide that it passes control to the translated first direct jump target address.

26. The computer system of claim 5, wherein:

the multi-branch instruction translator further is constructed and arranged to
determine a first number of potential control paths out of the first multi-branch-jump instruction,
generate a second number of backpatch-table instructions, wherein the second number is at least equal to the first number and each backpatch-table instruction corresponds to one potential control path,
store a same dynamic backpatching code address in each backpatch-table instruction,
generate, when the translated first target instruction exists, at least one dynamic backpatching instruction that preserves a first original target instruction address that is the address of an original target instruction, and a backpatch-table instruction address that is the address of a backpatch-table instruction and that corresponds with the first original target instruction address, and
translate the first multi-branch jump instruction, including replacing a second original target instruction address with a corresponding second backpatch-table instruction address.

27. The computer system of claim 26, wherein:

the multi-branch instruction translator stores the same dynamic backpatching code address in each record when the first multi-branch-jump instruction is first executed.

28. The computer system of claim 26, wherein:

the dynamic backpatching instruction operates only with respect to the first multi-branch jump instruction.

29. The computer system of claim 26, wherein:

the multi-branch backpatcher further is constructed and arranged to
determine, when the first multi-branch jump instruction is executed, the one backpatch-table instruction to which control passes,
replace, in the one backpatch-table instruction, the same dynamic backpatching code address with a translated first original target instruction address.

30. The computer system of claim 29, wherein:

the at least one dynamic backpatching instruction, when executed, transfers control to the multi-branch backpatcher.

31. A computer system having at least one central processing unit (CPU) and at least one memory unit having stored therein a plurality of original instructions of an executable file, including a first multi-branch-jump instruction and one or more multi-branch-jump-table instructions each identifying an address of an original target instruction among the plurality of original instructions to which control transfers when control passes to each multi-branch-jump-table instruction from the first multi-branch-jump instruction, the memory unit also having stored therein a set of multi-branch backpatching dynamic translation instructions for execution by the at least one CPU comprising:

(1) a multi-branch instruction translator constructed and arranged to translate the first multi-branch jump instruction to provide a translated first multi-branch-jump instruction;

translate a first of the multi-branch-jump-table instructions to provide a translated first multi-branch-jump-table instruction;

determine when there exists a translated first target instruction that is a translation of a first original target instruction of the first multi-branch-jump-table instruction; and (2) a multi-branch backpatcher constructed and arranged to backpatch, when the translated first target instruction exists, the translated first multi-branch-jump-table instruction to provide that it passes control to the translated first target instruction.

32. The computer system of claim 31, wherein:

the multi-branch backpatcher backpatches the translated first multi-branch-jump-table instruction when control passes to the translated first multi-branch-jump-table instruction.

33. The computer system of claim 31, further comprising:

(3) an instruction analyzer constructed and arranged to identify, when present, the first multi-branch-jump instruction, and identify, when present, the one or more multi-branch-jump-table instructions.

34. Storage media that contains software that, when executed on an appropriate computing system having at least one central processing unit (CPU) and at least one memory unit having stored therein a plurality of original instructions of an executable file including a first multi-branch-jump instruction and one or more multi-branch-jump-table instructions each identifying an address of an original target instruction among the plurality of original instructions to which control transfers when control passes to each multi-branch-jump-table instruction from the first multi-branch-jump instruction, performs a method for multi-branch backpatching in a dynamic translator comprising:

(1) translating the first multi-branch jump instruction to provide a translated first multi-branch-jump instruction;

(2) translating a first of the multi-branch-jump-table instructions to provide a translated first multi-branch-jump-table instruction;

(3) determining when there exists a translated first target instruction that is a translation of a first original target instruction of the first multi-branch-jump-table instruction; and (4) when the translated first target instruction exists, backpatching the translated first multi-branch-jump-table instruction to provide that it passes control to the translated first target instruction.

35. The storage media of claim 34, wherein:

step (4) of the method performed by the software is done when control passes to the translated first multi-branch-jump-table instruction.

36. The storage media of claim 34, wherein the method performed by the software further comprises:

(5) identifying from the plurality of original instructions the first multi-branch-jump instruction; and (6) identifying from the plurality of original instructions the one or more multi-branch-jump-table instructions.

37. A computer program product for use with an appropriate computing system having at least one central processing unit (CPU) and at least one memory unit having stored therein a plurality of original instructions of an executable file including a first multi-branch-jump instruction and one or more multi-branch-jump-table instructions each identifying an address of an original target instruction among the plurality of original instructions to which control transfers when control passes to each multi-branch-jump-table instruction from the first multi-branch-jump instruction, the computer program product comprising a computer usable medium having embodied therein computer readable program code method steps, the method steps comprising:

(1) translating the first multi-branch jump instruction to provide a translated first multi-branch-jump instruction;

(2) translating a first of the multi-branch-jump-table instructions to provide a translated first multi-branch-jump-table instruction;

(3) determining when there exists a translated first target instruction that is a translation of a first original target instruction of the first multi-branch-jump-table instruction; and (4) when the translated first target instruction exists, backpatching the translated first multi-branch-jump-table instruction to provide that it passes control to the translated first target instruction.

38. The computer program product of claim 37, wherein:

step (4) of the computer readable program code method steps is done when control passes to the translated first multi-branch-jump-table instruction.

* * * * *